US012659704B2

(12) United States Patent
Chai

(10) Patent No.: US 12,659,704 B2
(45) Date of Patent: Jun. 16, 2026

(54) LAN GROUP CHARGING METHOD AND RELATED APPARATUS

(71) Applicant: HUAWEI TECHNOLOGIES CO., LTD., Shenzhen (CN)

(72) Inventor: Xiaoqian Chai, Dongguan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 283 days.

(21) Appl. No.: 18/342,135

(22) Filed: Jun. 27, 2023

(65) Prior Publication Data

US 2023/0345211 A1      Oct. 26, 2023

Related U.S. Application Data

(63) Continuation of application No. PCT/CN2021/143686, filed on Dec. 31, 2021.

(30) Foreign Application Priority Data

Dec. 31, 2020    (CN) .......................... 202011641690.0

(51) Int. Cl.
H04W 4/24                (2024.01)
(52) U.S. Cl.
CPC ..................................... H04W 4/24 (2013.01)
(58) Field of Classification Search
CPC ......... H04W 4/24; H04W 4/08; H04M 15/41; H04M 15/765; H04M 15/7655; H04L 12/14
USPC ......................................................... 455/406
See application file for complete search history.

(56) References Cited

U.S. PATENT DOCUMENTS

| | | | |
|---|---|---|---|
| 9,602,676 B2 | 3/2017 | Lehane et al. | |
| 2015/0373205 A1* | 12/2015 | Li | H04M 15/41 |
| | | | 455/406 |
| 2016/0072963 A1* | 3/2016 | Cai | H04L 12/1407 |
| | | | 370/259 |

FOREIGN PATENT DOCUMENTS

| | | |
|---|---|---|
| WO | 2020036882 A1 | 2/2020 |
| WO | 2020205725 A1 | 10/2020 |

OTHER PUBLICATIONS

3GPP TS 23.502 V16.7.0, "3rd Generation Partnership Project; Technical Specification Group Services and System Aspects; Procedures for the 5G System (5GS); Stage 2 (Release 16)," Dec. 2020, 603 pages.
SA WG5, "New SID on Charging Aspects of 5G LAN-type Services," TSG SA Meeting #SA-90E, SP-201081, Electronic meeting, Dec. 8-14, 2020, 3 pages.
Extended European Search Report in European Appln No. 21914712.1, dated Jan. 15, 2024, 16 pages.

(Continued)

*Primary Examiner* — Huy C Ho
(74) *Attorney, Agent, or Firm* — Fish & Richardson P.C.

(57)                ABSTRACT

Implementations of the present disclosure relate to charging fees of a local area network group (LAN). In an implementation, a charging method includes: obtaining first group information of a local area network (LAN) group, wherein the first group information comprises one or more of: an identifier of a customer to which the LAN group belongs, an external group identifier of the LAN group, an internal group identifier of the LAN group, or a quantity of members in the LAN group, and performing charging for the LAN group based on the first group information of the LAN group.

20 Claims, 10 Drawing Sheets

(56) References Cited

OTHER PUBLICATIONS

EP Communication Pursuant to Article 94(3) EPC in European Appln. No. 21914712.1, mailed on Oct. 31, 2024, 8 pages.

3GPP TS 23.501 V16.7.0, "3rd Generation Partnership Project; Technical Specification Group Services and System Aspects; System architecture for the 5G System (5GS); Stage 2 (Release 16)," Dec. 2020, 450 pages.

3GPP TS 23.503 V16.7.0, "3rd Generation Partnership Project; Technical Specification Group Services and System Aspects; Policy and charging control framework for the 5G System (5GS); Stage 2 (Release 16)," Dec. 2020, 119 pages.

* cited by examiner

| Management function entity | — | Charging enablement function entity | — | Charging processing function entity |

LAN GROUP CHARGING METHOD AND RELATED APPARATUS

CROSS-REFERENCE TO RELATED APPLICATIONS

This application is a continuation International Application No. PCT/CN2021/143686, filed on Dec. 31, 2021, which claims priority to Chinese Patent Application No. 202011641690.0, filed on Dec. 31, 2020. The disclosures of the aforementioned applications are hereby incorporated by reference in their entireties.

TECHNICAL FIELD

This disclosure relates to the field of communication technologies, and in particular, to a LAN group charging method and a related apparatus.

BACKGROUND

A local area network (Local Area Network, LAN) is a computer communication network in which various computers, external devices, data repositories, and the like in a local area (such as a school, a factory, or an enterprise) are connected to each other. The LAN can be connected to a remote local area network, a remote data repository, or a remote processing center through a data communication network or a dedicated data circuit, to form a large-scale information processing system.

As a new enterprise office mode and a smart home mode emerge, disadvantages of a wired local area network and a WLAN with respect to complex deployment, flexibility, mobility, and a coverage area are exposed. This promotes further development of a local area network technology, to meet a requirement of a future application for a LAN. It is more advantageous to provide a LAN service through a mobile network, for example, a 5G LAN provided through a 5th generation (5th Generation, 5G) network.

The 5G LAN introduces a concept of group management of user equipments, and supports direct communication between user equipments in a group. The 5G LAN may be used in a wider mobile network coverage area, that is, LAN-based data exchange and communication may be implemented between a plurality of user equipments in a group that are not in a same region. In this way, the 5G LAN can provide functions similar to those of the local area network and a virtual private network in the fields of residences, offices, enterprises, factories and the like. In addition, the 5G LAN implements cross-region collaboration between different workshops and between different factories of an enterprise to form a private wide area network, and meets requirements such as convenient management, flexible operations, and reliable communication.

With continuous development of a 5G LAN technology, a large quantity of customers are to subscribe to a 5G LAN service. Therefore, corresponding LAN service charging becomes more concerned.

SUMMARY

Embodiments of this disclosure provide a LAN group charging method and an apparatus, to implement charging for a LAN group.

According to a first aspect, this disclosure provides a LAN group charging method. In the method, a charging processing function entity obtains first group information of a LAN group, where the first group information includes one or more of the following: an identifier of a customer to which the LAN group belongs, an external group identifier of the LAN group, an internal group identifier of the LAN group, or a quantity of members in the LAN group; and further performs charging for the LAN group based on the first group information of the LAN group. In the technical solution, the charging processing function entity obtains the first group information of the LAN group, to implement charging at a granularity of the LAN group and meet a charging requirement of a LAN service.

With reference to the first aspect, in some implementations of the first aspect, that the charging processing function entity performs charging based on the first group information includes: The charging processing function entity generates a charging data record of the LAN group, where the charging data record includes the first group information.

With reference to the first aspect, in some implementations of the first aspect, the external group identifier is associated with the internal group identifier and the identifier of the customer. Therefore, the charging processing function entity can implement complete charging for the customer-oriented LAN service based on correspondences between the external group identifier and each of the internal group identifier and the identifier of the customer, in other words, can implement charging for the LAN group.

With reference to the first aspect, in some implementations of the first aspect, the first group information includes the internal group identifier of the LAN group, and the performing charging for the LAN group includes: associating network-side charging information of the LAN group based on the internal group identifier, where the network-side charging information includes one or more of the following: traffic usage, duration usage, or a quantity of connections. Further, the first group information may further include the external group identifier, and the performing charging for the LAN group further includes: associating, based on the correspondence between the external group identifier and the internal group identifier, the network-side charging information of the LAN group with the external group identifier and/or the customer corresponding to the external group identifier.

With reference to the first aspect, in some implementations of the first aspect, that the charging processing function entity obtains first group information of a LAN group includes: The charging processing function entity receives the first group information of the LAN group that is sent by a charging enablement function entity.

With reference to the first aspect, in some implementations of the first aspect, the charging processing function entity further receives a fifth message sent by the charging enablement function entity, where the fifth message carries changed first group information of the LAN group. Optionally, the fifth message further indicates an update report. Therefore, when the LAN group changes, the charging processing function entity can obtain a change of charging information of the LAN group, to implement precise charging for the LAN service.

With reference to the first aspect, in some implementations of the first aspect, the charging processing function entity further obtains second group information of the LAN group from a management function entity based on the external group identifier, the internal group identifier, and/or the identifier of the customer, where the second group information includes one or more of the following: the identifier of the customer, the external group identifier, the internal group identifier, or a member list of the LAN group;

and obtains the first group information based on the second group information (for example, calculates the member list of the LAN group to obtain the quantity of members of the LAN group). In the technical solution, the charging processing function entity preprocesses the information about the LAN group obtained from the management function entity, to facilitate subsequent charging for use.

With reference to the first aspect, in some implementations of the first aspect, that the charging processing function entity obtains second group information from a management function entity based on the external group identifier includes: The charging processing function entity sends a first message to the management function entity, where the first message carries the external group identifier; and further receives a second message sent by the management function entity, where the second message carries the internal group identifier and/or the member list of the LAN group that correspond/corresponds to the external group identifier.

With reference to the first aspect, in some implementations of the first aspect, that the charging processing function entity obtains second group information from a management function entity based on the identifier of the customer specifically includes: The charging processing function entity sends a first message to the management function entity, where the first message carries the identifier of the customer; and further receives a second message sent by the management function entity, where the second message carries the external group identifier, the internal group identifier, and/or the member list of the LAN group that correspond/corresponds to the identifier of the customer.

With reference to the first aspect, in some implementations of the first aspect, that the charging processing function entity obtains second group information from a management function entity based on the internal group identifier includes: The charging processing function entity sends a first message to the management function entity, where the first message carries the internal group identifier; and further receives a second message sent by the management function entity, where the second message carries the external group identifier, the identifier of the customer, and/or the member list of the LAN group that correspond/corresponds to the internal group identifier.

With reference to the first aspect, in some implementations of the first aspect, the charging processing function entity further sends a subscription message to the management function entity, where the subscription message carries the external group identifier, the internal group identifier, and/or the identifier of the customer, and the subscription message is used to subscribe to a notification of a change of the second group information. In the technical solution, the charging processing function entity subscribes to a change of the LAN group from the management function entity, so that when the LAN group changes, the charging processing function entity can receive the notification of the change of the LAN group in time.

With reference to the first aspect, in some implementations of the first aspect, the charging processing function entity further receives a notification message sent by the management function entity, where the notification message is triggered by the change of the second group information, and the notification message carries changed second group information; further determines changed first group information of the LAN group based on the changed second group information; and further performs charging based on the changed first group information. Therefore, when the LAN group changes, the charging processing function entity can receive the notification of the change of the LAN group, to implement precise charging for the LAN service.

With reference to the first aspect, in some implementations of the first aspect, the change of the second group information includes that the second group information is created. That the charging processing function entity obtains second group information from a management function entity includes: The charging processing function entity further sends a subscription message to the management function entity; and receives a notification message sent by the management function entity, where the notification message carries the second group information. Therefore, when the LAN group is created (the second group information is created), the charging processing function entity can receive the second group information of the created LAN group.

With reference to the first aspect, in some implementations of the first aspect, the change of the second group information includes that a specific item in the second group information changes. For example, if the changed specific item is the member list of the LAN group, the charging processing function entity determines a changed quantity of members in the LAN group based on the changed member list of the LAN group. The changed first group information includes the changed quantity of members in the LAN group.

With reference to the first aspect, in some implementations of the first aspect, the charging processing function entity further obtains LAN service information, where the LAN service information includes the external group identifier and/or the identifier of the customer. Optionally, the charging processing function entity further determines, based on the LAN service information, that the second group information and/or the first group information need/needs to be obtained. Optionally, the charging processing function entity further determines, based on the LAN service information, that the notification of the change of the second group information needs to be subscribed to.

With reference to the first aspect, in some implementations of the first aspect, the first group information further includes one or more of the following: the member list of the LAN group, a PDU session type of the LAN group, a DNN of the LAN group, slice information of the LAN group, and/or application information of the LAN group.

With reference to the first aspect, in some implementations of the first aspect, the second group information further includes one or more of the following: the PDU session type of the LAN group, the DNN of the LAN group, the slice information of the LAN group, and/or the application information of the LAN group.

With reference to the first aspect, for the foregoing implementations, the management function entity may be replaced with a data repository service function entity.

According to a second aspect, this disclosure provides a LAN group charging method. In the method, a charging enablement function entity obtains first group information of a LAN group, where the first group information includes one or more of the following: an identifier of a customer to which the LAN group belongs, an external group identifier of the LAN group, an internal group identifier of the LAN group, or a quantity of members in the LAN group; and the charging enablement function entity further sends the first group information to a charging processing function entity. Specifically, the first group information is used to perform charging for the LAN group. In the technical solution, the first group information of the LAN group is provided for the charging enablement function entity, to implement charging at a granularity of the LAN group and meet a charging requirement of a LAN service.

With reference to the second aspect, in some implementations of the second aspect, the charging enablement function entity further obtains second group information of the LAN group from a management function entity based on the external group identifier of the LAN group, the internal group identifier of the LAN group, and/or the identifier of the customer, where the second group information includes one or more of the following: the identifier of the customer, the external group identifier, the internal group identifier, or a member list of the LAN group; and obtains the first group information based on the second group information. In the technical solution, the charging enablement function entity obtains the second group information of the LAN group from the management function entity, and preprocesses the second group information to obtain the first group information used for charging (for example, calculates the member list of the LAN group to obtain the quantity of members of the LAN group). The preprocessing operation of the charging enablement function entity facilitates charging for the LAN service.

With reference to the second aspect, in some implementations of the second aspect, that the charging enablement function entity obtains second group information from a management function entity based on the external group identifier specifically includes: The charging enablement function entity sends a first message to the management function entity, where the first message carries the external group identifier; and further receives a second message sent by the management function entity, where the second message carries the internal group identifier and/or the member list of the LAN group that correspond/corresponds to the external group identifier.

With reference to the second aspect, in some implementations of the second aspect, that the charging enablement function entity obtains second group information from a management function entity based on the identifier of the customer specifically includes: The charging enablement function entity sends a first message to the management function entity, where the first message carries the identifier of the customer; and further receives a second message sent by the management function entity, where the second message carries the external group identifier, the internal group identifier, and/or the member list of the LAN group that correspond/corresponds to the identifier of the customer.

With reference to the second aspect, in some implementations of the second aspect, the charging enablement function entity further sends a subscription message to the management function entity, where the subscription message carries the external group identifier, the internal group identifier, and/or the identifier of the customer, and the subscription message is used to subscribe to a notification of a change of the second group information. In the technical solution, the charging enablement function entity subscribes to a change of the LAN group from the management function entity, so that when the LAN group changes, the charging enablement function entity can receive the notification of the change of the LAN group in time.

With reference to the second aspect, in some implementations of the second aspect, the charging enablement function entity further receives a notification message sent by the management function entity, where the notification message is triggered by the change of the second group information, and the notification message carries changed second group information; further determines changed first group information of the LAN group based on the changed second group information; and further sends the changed first group information to the charging processing function entity. Therefore, when the LAN group changes, the charging enablement function entity can receive the notification of the change of the LAN group, and further send the change of the LAN group to the charging processing function entity, to implement precise charging for the LAN service.

With reference to the second aspect, in some implementations of the second aspect, that the change of the second group information includes that the second group information is created. The obtaining second group information from a management function entity includes: The charging enablement function entity further sends a subscription message to the management function entity; and receives a notification message sent by the management function entity, where the notification message carries the second group information. Therefore, when the LAN group is created (the second group information is created), the charging enablement function entity can receive the second group information of the created LAN group.

With reference to the second aspect, in some implementations of the second aspect, that the change of the second group information includes that a specific item in the second group information changes. For example, if the changed specific item is the member list of the LAN group, the charging enablement function entity determines a changed quantity of members in the LAN group based on the changed member list of the LAN group. The changed first group information includes the changed quantity of members in the LAN group.

With reference to the second aspect, in some implementations of the second aspect, the charging enablement function entity further obtains LAN service information, where the LAN service information includes the external group identifier and/or the identifier of the customer. Optionally, the charging enablement function entity further determines, based on the LAN service information, that the second group information and/or the first group information need/needs to be obtained. Optionally, the charging enablement function entity further determines, based on the LAN service information, that the notification of the change of the second group information needs to be subscribed to.

With reference to the second aspect, in some implementations of the second aspect, the first group information further includes one or more of the following: the member list of the LAN group, a PDU session type of the LAN group, a DNN of the LAN group, slice information of the LAN group, and/or application information of the LAN group.

With reference to the second aspect, in some implementations of the second aspect, the second group information further includes one or more of the following: the PDU session type of the LAN group, the DNN of the LAN group, the slice information of the LAN group, and/or the application information of the LAN group.

With reference to the second aspect, in some implementations of the second aspect, that the charging enablement function entity sends the first group information to a charging processing function entity includes: The charging enablement function entity sends the first group information to the charging processing function entity based on a charging resource and/or an event.

With reference to the second aspect, for the foregoing implementations, the management function entity may be replaced with a data repository service function entity.

According to a third aspect, this disclosure provides a LAN group charging method. In the method, a management function entity obtains second group information of a LAN group, where the second group information includes one or more of the following: an identifier of a customer to which the LAN group belongs, an external group identifier, an internal group identifier, or a member list of the LAN group; and sends the second group information to a charging enablement function entity or a charging processing function entity. The management function entity provides the second group information for the charging enablement function entity or the charging processing function entity, to help implement charging at a granularity of the LAN group and meet a charging requirement of a LAN service.

With reference to the third aspect, in some implementations of the third aspect, the management function entity further receives a first message sent by the charging enablement function entity or the charging processing function entity, where the first message carries the external group identifier, the internal group identifier, and/or the identifier of the customer. That a management function entity obtains second group information includes: The management function entity obtains the second group information based on the external group identifier, the internal group identifier, and/or the identifier of the customer. That the management function entity sends the second group information to a charging enablement function entity or a charging processing function entity includes: The management function entity sends a second message to the charging enablement function entity or the charging processing function entity, where the second message carries the second group information.

With reference to the third aspect, in some implementations of the third aspect, the management function entity further receives a subscription message sent by the charging enablement function entity or the charging processing function entity, where the subscription message is used to subscribe to a notification of a change of the second group information, and the subscription message carries the external group identifier, the internal group identifier, and/or the identifier of the customer. In the technical solution, a change of the LAN group is subscribed to from the management function entity, so that when the LAN group changes, the management function entity can send a notification of the change of the LAN group to the charging enablement function entity or the charging processing function entity in time.

With reference to the third aspect, in some implementations of the third aspect, the management function entity further sends a notification message to the charging enablement function entity or the charging processing function entity, where the notification message carries changed second group information, and the changed second group information is created second group information or second group information obtained after a specific item changes.

With reference to the third aspect, in some implementations of the third aspect, the second group information further includes one or more of the following: a PDU session type of the LAN group, a DNN of the LAN group, slice information of the LAN group, and/or application information of the LAN group.

With reference to the third aspect, in some implementations of the third aspect, the second group information is used to determine first group information of the LAN group, and the first group information of the LAN group is used to perform charging for the LAN group.

With reference to the third aspect, in some implementations of the third aspect, the first group information includes one or more of the following: the identifier of the customer to which the LAN group belongs, the external group identifier of the LAN group, the internal group identifier of the LAN group, a quantity of members in the LAN group, the member list of the LAN group, the PDU session type of the LAN group, the DNN of the LAN group, the slice information of the LAN group, and/or the application information of the LAN group.

With reference to the third aspect, for the foregoing implementations, the management function entity may be replaced with a data repository service function entity. Specifically, the data repository service function entity may be a unified data storage entity.

With reference to the third aspect, in some implementations of the third aspect, the management function entity is specifically a unified data management function entity.

With reference to the third aspect, in some implementations of the third aspect, the management function entity is specifically a network exposure function entity or a session management function entity. The obtaining second group information includes: The management function entity obtains the second group information from the unified data management function entity or a unified data repository function entity based on the external group identifier, the internal group identifier, and/or the identifier of the customer.

According to a fourth aspect, this disclosure provides a LAN group charging method. The method is jointly performed by a charging enablement function entity and a charging processing function entity. In the method, the charging enablement function entity obtains second group information of a LAN group from a management function entity, where the second group information includes one or more of the following: an identifier of a customer to which the LAN group belongs, an external group identifier, an internal group identifier, or a member list of the LAN group. Further, the charging enablement function entity obtains first group information of the LAN group based on the second group information, where the first group information includes one or more of the following: the identifier of the customer to which the LAN group belongs, the external group identifier of the LAN group, the internal group identifier of the LAN group, or a quantity of members in the LAN group. The charging enablement function entity further sends the first group information of the LAN group to the charging processing function entity, so that the charging processing function entity performs charging for the LAN group based on the first group information of the LAN group.

The method may alternatively be jointly performed by a management function entity and a charging enablement function entity. In the method, the management function entity obtains second group information of a LAN group, and sends the second group information of the LAN group to the charging enablement function entity.

For specific implementations and/or optional implementations of the method, refer to the first aspect to the third aspect. Details are not described herein again.

According to a fifth aspect, this disclosure provides a LAN group charging method. The method is jointly performed by a charging processing function entity and a management function entity. In the method, the charging processing function entity obtains second group information of a LAN group from the management function entity, where the second group information includes one or more of the following: an identifier of a customer to which the LAN group belongs, an external group identifier, an internal group identifier, or a member list of the LAN group. Further, the charging processing function entity obtains first group information of the LAN group based on the second group information, where the first group information includes one or more of the following: the identifier of the customer to which the LAN group belongs, the external group identifier of the LAN group, the internal group identifier of the LAN group, or a quantity of members in the LAN group, so that the charging processing function entity performs charging for the LAN group based on the first group information of the LAN group. The management function entity obtains the second group information of the LAN group, and sends the second group information of the LAN group to the charging processing function entity.

For specific implementations and/or optional implementations of the method, refer to the first aspect to the third aspect. Details are not described herein again.

Different implementations of the LAN group charging method in this disclosure are explained in the first aspect to the third aspect. The foregoing implementations may be implemented by using devices of different types.

According to a sixth aspect, this disclosure provides a charging processing function entity. The charging processing function entity includes a functional module that performs the LAN group charging method according to any one of the first aspect or the possible implementations of the first aspect. Division into the functional modules is not limited in this disclosure. The functional modules may be correspondingly obtained through division (for example, divided into a communication module and/or a processing module) based on procedure steps of the LAN group charging method according to the first aspect, or the functional modules may be obtained through division based on a specific implementation requirement. The functional modules may be implemented by hardware, or may be implemented by hardware by executing corresponding software.

According to a seventh aspect, this disclosure provides a charging enablement function entity. The charging enablement function entity includes a functional module that performs the LAN group charging method according to any one of the second aspect or the implementations of the second aspect. Division into the functional modules is not limited in this disclosure. The functional modules may be correspondingly obtained through division (for example, divided into a communication module and/or a processing module) based on procedure steps of the LAN group charging method according to the second aspect, or the functional modules may be obtained through division based on a specific implementation requirement. The functional modules may be implemented by hardware, or may be implemented by hardware by executing corresponding software.

According to an eighth aspect, this disclosure provides a management function entity or a data repository service function entity. The function entity includes a functional module that performs the LAN group charging method according to any one of the third aspect or the implementations of the third aspect. Division into the functional modules is not limited in this disclosure. The functional modules may be correspondingly obtained through division (for example, divided into a communication module and/or a processing module) based on procedure steps of the LAN group charging method according to the third aspect, or the functional modules may be obtained through division based on a specific implementation requirement. The functional modules may be implemented by hardware, or may be implemented by hardware by executing corresponding software.

According to a ninth aspect, this disclosure provides a charging processing function entity. The charging processing function entity includes a memory and a processor. The memory is configured to store program code, and the processor is configured to invoke the program code to implement the method according to any one of the first aspect and the implementations of the first aspect in this disclosure.

According to a tenth aspect, this disclosure provides a charging enablement function entity. The charging enablement function entity includes a memory and a processor. The memory is configured to store program code, and the processor is configured to invoke the program code to implement the method according to any one of the second aspect and the implementations of the second aspect in this disclosure.

According to an eleventh aspect, this disclosure provides a management function entity or a data repository service function entity. The function entity includes a memory and a processor. The memory is configured to store program code, and the processor is configured to invoke the program code to implement the method according to any one of the third aspect and the implementations of the third aspect in this disclosure.

According to a twelfth aspect, this disclosure provides a LAN group charging system. The system includes: a charging processing function entity and a charging enablement function entity. The charging processing function entity is configured to perform the method according to any one of the first aspect and the implementations of the first aspect in this disclosure. The charging enablement function entity is configured to perform the method according to any one of the second aspect and the implementations of the second aspect in this disclosure.

Optionally, the system further includes: a management function entity or a data repository service function entity, configured to perform the method according to any one of the third aspect and the implementations of the third aspect in this disclosure.

According to a thirteenth aspect, this disclosure provides a LAN group charging system. The system includes: a charging processing function entity and a management function entity. The charging processing function entity is configured to perform the method according to any one of the first aspect and the implementations of the first aspect in this disclosure. The management function entity is configured to perform the method according to any one of the third aspect and the implementations of the third aspect in this disclosure.

According to a fourteenth aspect, this disclosure provides a LAN group charging system. The system includes: a charging processing function entity and a data repository service function entity. The charging processing function entity is configured to perform the method according to any one of the first aspect and the implementations of the first aspect in this disclosure. The data repository service function entity is configured to perform the method according to any one of the third aspect and the implementations of the third aspect in this disclosure.

According to a fifteenth aspect, this disclosure provides a computer program product. The computer program product includes computer program code. When the computer program code is run on a computer, the computer is enabled to perform the method according to any possible implementation of any one of the foregoing aspects.

According to a sixteenth aspect, a computer-readable medium is provided. The computer-readable medium is configured to store a computer program. The computer program includes instructions used to perform the method according to any possible implementation of any one of the foregoing aspects.

According to a seventeenth aspect, a communication chip is provided. The communication chip stores instructions. When the instructions are run on a computer device, the communication chip is enabled to perform the method according to any possible implementation of any one of the foregoing aspects.

In addition, for technical effects brought by any one of the implementations of the fourth to the sixteenth aspects, refer to technical effects brought by different implementations of the first to the third aspects. Details are not described herein again.

These aspects or other aspects in embodiments of this disclosure are clearer and more comprehensible in descriptions of the following embodiments.

DESCRIPTION OF EMBODIMENTS

The following describes embodiments of this disclosure with reference to the accompanying drawings in embodiments of this disclosure.

In this disclosure, user equipments in a same group may communicate with each other through a local area network (LAN) provided by a mobile network, for example, a 5G LAN. For ease of understanding this disclosure, the following first describes some concepts related to the LAN in the solutions in this disclosure.

(1) A LAN service, also referred to as a LAN-type service (LAN-Type Service). The LAN service is a service that provides private communication by using an Internet protocol (Internet Protocol, IP)/non-Internet protocol (non-Internet Protocol, non-IP) communication type in a mobile network system. For example, a 5G LAN service is a service that provides private communication by using the IP/non-IP communication type in a 5G system.

(2) A LAN group, also referred to as a virtual network (Virtual Network, VN) group. The LAN group is a set of user equipments that perform private communication in the LAN service. For example, a 5G LAN group is a set of user equipments that perform private communication in a 5G LAN service.

It should be understood that a future communication system such as a 6G system is also similar to the foregoing. Details are not described again.

Figures 1A, 1B:
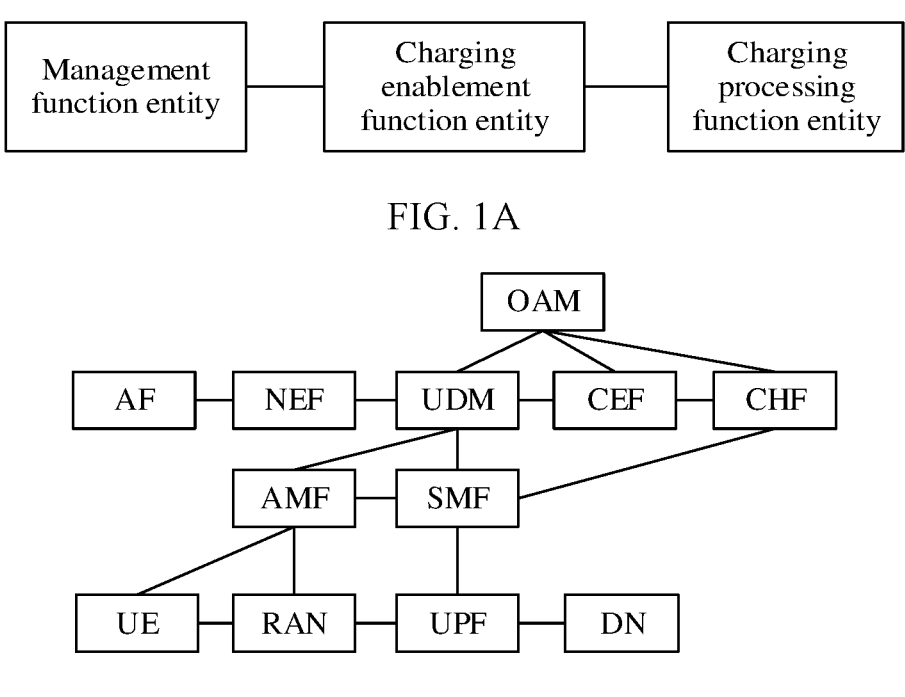
FIG. 1A is a schematic diagram of a possible network architecture according to an embodiment of this disclosure.
FIG. 1B is a schematic diagram of another possible network architecture according to an embodiment of this disclosure.

FIG. 1A is a schematic diagram of a possible network architecture to which an embodiment of this disclosure is applicable. The network architecture may include devices such as a management function entity, a charging enablement function entity, and a charging processing function entity.

The charging enablement function entity is configured to provide, for the charging processing function entity, information (for example, information required for group charging) required for charging. Specifically, the charging enablement function entity is configured to: obtain first group information of a LAN group, and send the first group information to the charging processing function entity. For example, the charging enablement function entity is configured to: obtain second group information of the LAN group from the management function entity, and determine the first group information based on the second group information, to further provide the first group information for the charging processing function entity. The charging enablement function entity may be further configured to subscribe to, from the management function entity, a notification of a change of the second group information of the LAN group, so that when the second group information changes, the management function entity sends the notification to the charging enablement function entity. The charging enablement function entity is further configured to: obtain LAN service information, and determine, based on the LAN service information, that the first group information and/or the second group information need/needs to be obtained. In a 5G communication system, the charging enablement function entity may be a charging enablement function (Charging Enablement Function, CEF) network element.

The first group information of the LAN group is used to perform charging for the LAN group. The first group information is specifically obtained by the charging enablement function entity, and is sent by the charging enablement function entity to the charging processing function entity. The first group information may specifically include one or more pieces of the following information of the LAN group: an identifier of a customer, an external group identifier, an internal group identifier, a quantity of members, a protocol data unit (Protocol Data Unit, PDU) session type, a data network name (Data Network Name, DNN), slice information (for example, single-network slice selection assistance information (Single-Network Slice Selection Assistance Information, S-NSSAI)), application information (for example, an application descriptor (application descriptor)), or the like. Specifically, the first group information is used to perform charging for the LAN group. The first group information of the LAN group may also be referred to as LAN/VN group charging information, group charging information, LAN/VN charging information, or the like.

The second group information of the LAN group is used to determine the first group information. The second group information is specifically obtained by the management function entity, and is sent by the management function entity to the charging enablement function entity. The second group information may specifically include one or more pieces of the following information of the LAN group: the identifier of the customer, the external group identifier, the internal group identifier, a member list (for example, a subscription permanent identifier (Subscription Permanent Identifier, SUPI) list or a generic public subscription identifier (Generic Public Subscription Identifier, GPSI) list), the PDU session type, the DNN, the slice information (for example, the S-NSSAI), the application information (for example, the application descriptor), or the like. The second group information may be part or all of content (specific items) in information about the LAN group stored in a data repository service function entity. The second group information may also be referred to as LAN/VN group information, LAN/VN group configuration, LAN/VN group subscription information, group information, group configuration, group subscription information, or the like. In addition, when the second group information of the LAN group changes, changed second group information of the LAN group is used to determine changed first group information of the LAN group.

The first group information of the LAN group is determined based on the second group information of the LAN group. In an optional manner, the first group information is the same as the second group information. For example, the second group information includes the identifier of the customer, the external group identifier, and the internal group identifier, and the first group information also includes these specific items. Therefore, names of the first group information and the second group information may also be the same. In another optional manner, the first group information may alternatively be different from the second group information. For example, the second group information includes the external group identifier and the member list, and the first group information includes the external group identifier and the quantity of members. The quantity of members in the first group information is determined based on the member list in the second group information. For another example, the second group information includes the identifier of the customer, the external group identifier, the internal group identifier, the member list, the PDU session type, the DNN, the S-NSSAI, and the application descriptor, and the first group information includes the identifier of the customer, the external group identifier, the internal group identifier, and the member list. The first group information includes part of content in the second group information, and specific included content may be determined based on content required for charging for the LAN group. In addition, the first group information may also include the member list, and the second group information may also include the quantity of members. This is not limited in this disclosure.

The management function entity is configured to provide the second group information of the LAN group for the charging enablement function entity. The management function entity may be further configured to receive a subscription message from the charging enablement function entity for the notification of the change of the second group information, to update the second group information to the charging enablement function entity in time.

In an optional manner, the management function entity further has a data storage function, and stores the second group information. For example, in the 5G communication system, the management function entity may have a unified data management (Unified Data Management, UDM) function and a unified data repository (Unified Data Repository, UDR) function. The UDM function and the UDR function may be deployed on a same physical device or different physical devices. In other words, the management function entity includes a UDM network element and a UDR network element, and the UDM network element and the UDR network element may be integrated or separately deployed. This is not limited in this disclosure.

In an optional manner, the management function entity obtains the second group information from another function entity. For example, the management function entity obtains the second group information from the data repository service function entity. The data repository service function entity stores the second group information. Specifically, the management function entity may be a data management function entity, or may be another function entity (such as an exposure function entity) that can obtain the second group information from the data repository service function entity. In the 5G communication system, the management function entity may be a UDM network element (the data management function entity), a network exposure function (Network Exposure Function, NEF) network element, a session management function (Session Management Function, SMF) network element, or the like. The data repository service function entity may be a unified data repository (Unified Data Repository, UDR) network element. For another example, the management function entity obtains the second group information from another management function entity. In the 5G communication system, the management function entity may be an NEF network element or an SMF network element, and the another management function entity may be a UDM network element.

It should be understood that the management function entity may alternatively be replaced with the data repository service function entity. To be specific, the charging enablement function entity obtains the second group information of the LAN group from the data repository service function entity, and the data repository service function entity stores the second group information and sends the second group information to the charging enablement function entity. In this case, the data repository service function entity may be further configured to receive a subscription message from the charging enablement function entity for the notification of the change of the second group information, to update the second group information to the charging enablement function entity in time.

The charging processing function entity is configured to process charging for the LAN service. Specifically, the charging processing function entity is configured to: obtain the first group information of the LAN group from the charging enablement function entity, and perform charging processing based on the first group information, for example, generate a charging data record or a bill. For example, in the 5G communication system, the charging processing function entity may be a charging function (Charging Function, CHF) network element. Alternatively, the charging processing function entity may include a CHF network element and a charging gateway function (Charging Gateway Function, CGF) network element, where the CHF network element and the CGF network element may be integrated or separately deployed. Alternatively, the charging processing function entity may include a CHF network element, a CGF network element, and a billing domain (Billing Domain, BD).

The system architecture may further include an operation management function entity (not shown in the figure). The operation management function entity is configured to subscribe to a LAN service with a customer, to generate LAN service information. The LAN service information may be information provided by the customer for enabling the LAN service, or may be generated by the operation management function entity based on information provided by the customer when the LAN service is enabled. The LAN service information specifically includes one or more of the following: an identifier of the customer, a charging mode, a charging factor, effective time, or the like. In an optional manner, if the operation management function entity creates a LAN group for the customer, the operation management function entity allocates an external group identifier to the LAN group. In this case, the LAN service information may further include the external group identifier. If the customer provides a member list when the LAN service is enabled, the LAN service information may further include the member list. The LAN service information may also be referred to as VN service information, LAN/VN service configuration, LAN/VN service subscription information, or the like.

The operation management function entity is further configured to send the LAN service information to the charging enablement function entity, so that the charging enablement function entity determines, based on the LAN service information, that the first group information of the LAN group needs to be obtained for charging for the LAN service. In the 5G communication system, the operation management function entity may be a customer relationship management (Customer Relationship Management, CRM) network element, an operation, administration and maintenance (Operation, Administration and Maintenance, OAM) system, and/or one or more network elements (for example, a business support system (Business Support System, BSS) and/or an operations support system (Operations Support System, OSS)) in the OAM system.

The system architecture may further include an application function entity and an exposure function entity (not shown in the figure). The exposure function entity is configured to securely expose, to the outside, a service, a capability, and the like that are provided by a function of a 3GPP network, for example, store data in a UDR through a standardized interface Nudr. Therefore, the application function entity provides information for the 3GPP network by using the exposure function entity. Specifically, the application function entity manages the LAN group by using the exposure function entity, for example, creation/update/deletion of the LAN group, where the update of the LAN group includes dynamic management (for example, deleting/reducing/modifying) of the members in the LAN group, and the like. In an optional manner, if the application function entity creates the LAN group, the application function entity allocates the external group identifier to the LAN group. The application function entity may be further configured to provide and/or update the member list of the LAN group. In the 5G communication system, the application function entity may be an application function (Application Function, AF) network element, and the exposure function entity may be the NEF network element.

It should be understood that, in a future communication system such as a 6G system, the function entities may have other names. This is not limited in this embodiment of this disclosure. The function entities may be network elements in a hardware device, or may be software functions running on dedicated hardware, or may be virtualization functions instantiated on a platform (such as a cloud platform). The function entity is an example name. For example, the charging enablement function entity may also be referred to as a charging enable function network element, a charging enable function instance, or the like.

The 5G communication system is used as an example. FIG. 1B is a schematic diagram of a specific possible network architecture to which an embodiment of this disclosure is applicable. The network architecture may include user equipment (User Equipment, UE), a radio access network (Radio Access Network, RAN), a user plane function (User Plane Function, UPF) network element, an AF network element, an NEF network element, an OAM system, a UDM network element, a CEF network element, a CHF network element, an access and mobility management function (Access and Mobility management Function, AMF) network element, an SMF network element, and the like.

The UE is a device having a wireless transceiver function, and may be specifically a mobile phone, a tablet computer, a computer having a wireless transceiver function, a virtual reality (virtual reality, VR) terminal, an augmented reality (augmented reality, AR) terminal, a wireless terminal in industrial control, a wireless terminal in self driving, a wireless terminal in telemedicine, a wireless terminal in a smart city, or the like. The RAN provides a wireless communication function for the UE, including but not limited to a next generation NodeB (gNodeB, gNB) in 5G. The UPF network element is configured to forward user plane data, and the like. UEs in a same LAN group may directly communicate with each other, and data may be transmitted in a plurality of ways. For example, (1) data is transmitted through an N6 interface between the UPF network element and a data network (Data Network, DN); (2) local interaction is performed by using a session anchor UPF network element; or (3) cross-user-plane data is forwarded through an N19 interface between different UPF network elements.

The OAM system is configured to support LAN service enabling and/or LAN group management. After the LAN service is enabled, the OAM system is further configured to send the LAN service information to other NEs such as the CEF network element and the CHF network element, so that these NEs support the LAN service based on the LAN service information. The AF network element interacts with the NEF network element to manage the LAN group. The OAM system and/or the AF network element provide/ provides data (for example, part or all of content in the second group information of the LAN group, and/or the LAN service information) of the LAN group for the UDM network element. The UDM network element is configured to manage subscription data (including the second group information of the LAN group), user access authorization, and the like. The CEF network element is configured to obtain the second group information of the LAN group from the UDM network element, determine the first group information of the LAN group based on the second group information, and send the first group information to the CHF network element. The CHF network element is configured to receive the first group information and perform charging based on the first group information.

The AMF network element is mainly used for mobility management (such as user location update, user network registration, and user switching) in a mobile network. The SMF network element is used for session management (such as session establishment, modification, and release) in the mobile network, to control data forwarding of the UPF network element. In terms of charging, the SMF network element is configured to create a charging session for a PDU session, to report network-side charging information (such as traffic, duration, or a quantity of connections) to the CHF network element.

It should be understood that connection lines between the network elements in FIG. 1B are merely an example of information transfer. A service-based interface is used in the 5G system. For example, the Nchf is a service-based interface provided by the CHF network element, and other network elements may also communicate with the CHF network element through the Nchf. Therefore, the connection lines in the figure do not limit communication between network elements. In addition, functions of the network elements in this disclosure are further described in detail in subsequent embodiments. The following describes the solutions in this disclosure with reference to specific embodiments.

Figure 2:
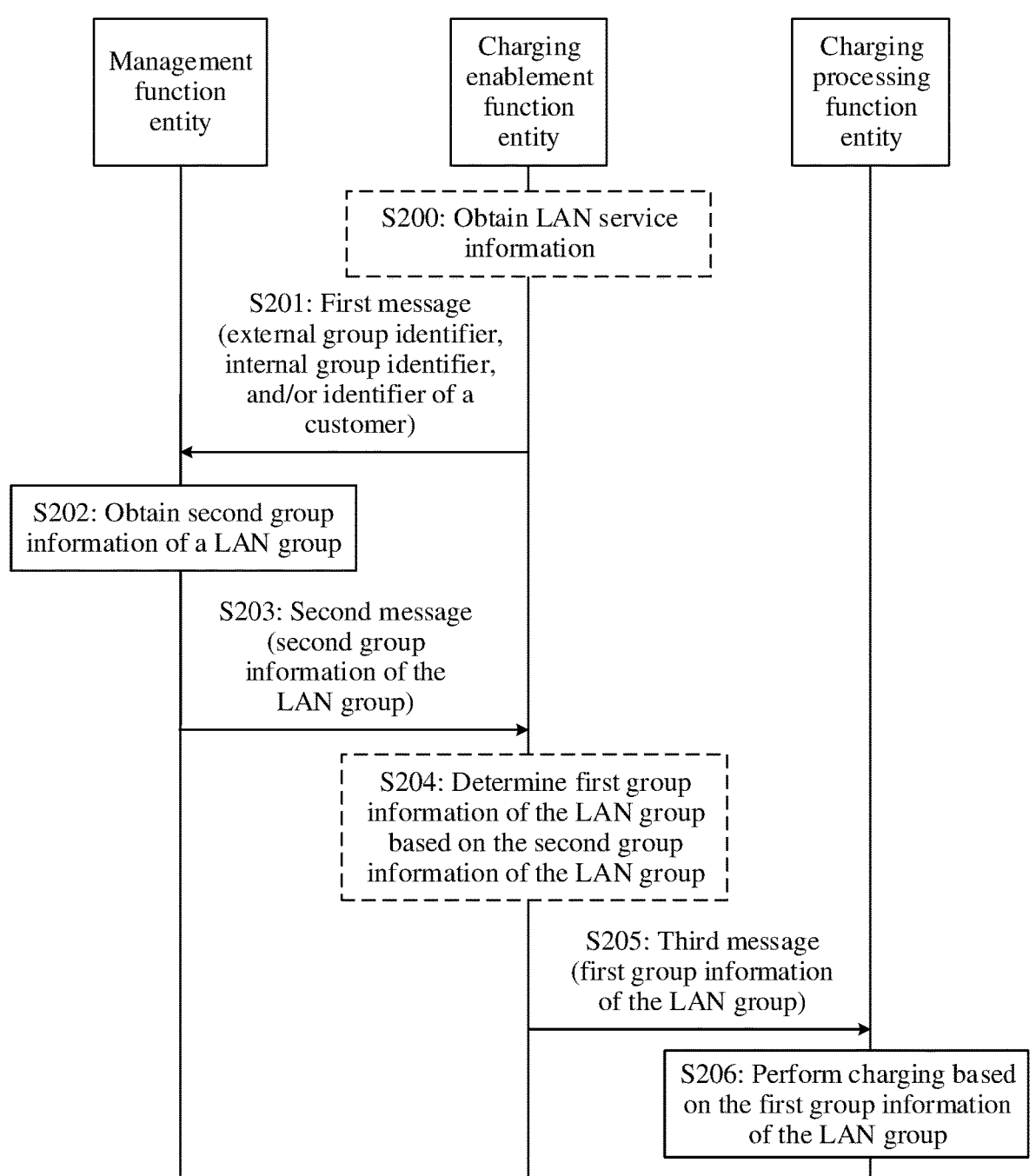
FIG. 2 is a flowchart of a group charging method according to an embodiment of this disclosure.

FIG. 2 shows a group charging method according to this disclosure. The method may be applied to the systems shown in FIG. 1A and FIG. 1B, or may be applied to another future communication system. Specific steps of the method are as follows:

200: A charging enablement function entity obtains LAN service information of a customer.

Specifically, the LAN service information is generated by an operation management function entity for enabling a LAN service for the customer, and the LAN service information specifically includes one or more of the following: an identifier of the customer, an external group identifier, a charging mode, a charging factor, effective time, or the like. The operation management function entity sends the LAN service information to the charging enablement function entity, and therefore the charging enablement function entity obtains the LAN service information.

Further, the charging enablement function entity determines, based on the LAN service information, whether to perform charging for the LAN service. If the charging enablement function entity determines to perform charging for the LAN service, the charging enablement function entity further determines, based on the LAN service information, group information required for charging for the LAN service, in other words, determines a to-be-obtained specific item in first group information of a LAN group based on the LAN service information. It should be understood that the LAN group is created for implementing the LAN service. In addition, for the first group information and the LAN service information, refer to the descriptions in the embodiment shown in FIG. 1A. Details are not described herein again.

Specifically, the charging enablement function entity determines, based on the LAN service information, that the charging mode is 2B charging. For example, the charging enablement function entity determines, based on content in the LAN service information that a charging party is a 2B customer, and/or that the charging factor includes a quantity of users, a quantity of connections, and the like, that the charging mode is 2B charging. Herein, 2B is short for to-Business, and is intended for the customer subscribing to the LAN service. The 2B charging herein means charging for the customer subscribing to the LAN service. For example, a fee is deducted from an account of the customer subscribing to the LAN service. It should be understood that 2B is originally intended for an enterprise customer. The customer subscribing to the LAN service is generally the enterprise customer, but a school, a factory, or even an individual (for example, subscribes to the LAN service for a family to implement direct communication between family members through respective UEs) may also subscribe to the LAN service. Therefore, the 2B charging in this disclosure is a broader expression. For example, a company A subscribes to the LAN service, and adds UEs of employees of the company A to the LAN group, so that the UEs of the employees of the company A can conveniently communicate with each other by using the LAN service. The 2B charging for the LAN service is intended for the company A instead of the employees. In other words, a fee is deducted from an account of the company A instead of accounts of the employees (user ends). When the LAN group is created for the customer subscribing to the LAN service, an application function entity or the operation management function entity (such as an OAM system) allocates the external group identifier (External Group ID) to the LAN group, where the external group identifier can be used and/or identified by devices (such as the application function entity and the operation management function entity) outside a core network. There is a correspondence between the external group identifier and the identifier of the customer. The external group identifier of the LAN group is useful for the 2B charging for the LAN service, for example, is associated with the customer. It should be understood that the external group identifier may be determined based on the identifier of the customer. For example, the identifier of the customer is "Huawei * ", and in this case, the external group identifier is "Huawei *-External001". Alternatively, the external group identifier may be a same identifier as the identifier of the customer. If the identifier of the customer can be directly determined based on the external group identifier, for example, a part before "-" in the external group identifier "Huawei* External001" is the identifier of the customer, the identifier of the customer may not be transferred as a separate information element. Therefore, the charging enablement function entity determines, based on the 2B charging mode, that the external group identifier and/or the identifier of the customer need/needs to be obtained for charging for the LAN service. In other words, the to-be-obtained specific item in the first group information includes the external group identifier and/or the identifier of the customer.

If the charging factor in the LAN service information includes a network-side charging factor such as traffic, duration, and/or a quantity of connections, network-side charging information such as traffic usage, duration usage, and/or a quantity of connections that is related to the LAN service needs to be obtained from a core network element such as an SMF network element or a network data analytics function (Network Data Analytics Function, NWDAF) network element during charging. The core network element collects the network-side charging information such as the traffic usage, the duration usage, and/or the quantity of connections based on a PDU session. However, one LAN group may include a plurality of UEs, and each UE may use a plurality of PDU sessions. Therefore, charging information collected based on the PDU session is fragmented, and therefore cannot meet a charging requirement of the LAN service. To distinguish among different LAN groups on a network side, when receiving a request for creating the LAN group, a data management function entity (for example, a UDM network element) allocates the internal group identifier (Internal Group ID) to the LAN group, where the internal group identifier can be used and/or identified by the core network element. The data management function entity further establishes a correspondence between the internal group identifier and the external group identifier of the LAN group. To better collect statistics on the network-side charging information of the LAN group, when the core network element collects and/or reports the network-side charging information based on the PDU session, the internal group identifier of the LAN group is carried. Therefore, the charging enablement function entity determines, based on the network-side charging factor, that the internal group identifier of the LAN group needs to be obtained for charging for the LAN service.

However, the 2B charging cannot be implemented only based on the internal group identifier of the LAN group. The devices outside the core network cannot identify the internal group identifier. For example, a billing domain (BD) cannot identify the internal group identifier, and therefore cannot perform charging for the customer. For example, a bill cannot be provided for the customer, or a fee cannot be deducted from the account of the customer. Therefore, the correspondence between the external group identifier and the internal group identifier of the LAN group is useful for charging for the LAN service. The internal group identifier of the LAN group is associated with fragmented network-side charging information that is based on the PDU session, so as to be associated with the network-side charging information of the LAN group. Further, the network-side charging information of the LAN group can be associated with the external group identifier of the LAN group based on the correspondence between the internal group identifier and the external group identifier, and then the network-side charging information of the LAN group can be associated with the customer of the LAN group (for example, based on the correspondence between the external group identifier and the identifier of the customer), to perform charging for the LAN service of the customer. Therefore, the charging enablement function entity determines, based on the network-side charging factor and the 2B charging mode, that the internal group identifier and the external group identifier of the LAN group need to be obtained (the correspondence between the internal group identifier and the external group identifier needs to be obtained) for charging for the LAN service. In other words, the to-be-obtained specific item in the first group information includes the external group identifier and the corresponding internal group identifier. In addition, the identifier of the customer may also be required. Details are not described herein again. It should be understood that, if there is a correspondence between the internal group identifier of the LAN group and the identifier of the customer, charging for the LAN service of the customer may alternatively performed by using the internal group identifier and the identifier of the customer. This is not limited in this disclosure.

If the charging factor in the LAN service information includes the quantity of members (which may also be referred to as a group scale, a quantity of users, or the like), the charging enablement function entity determines that the quantity of members in the LAN group needs to be obtained. In other words, the to-be-obtained specific item in the first group information includes the quantity of members in the LAN group.

Further, the charging enablement function entity determines, based on the to-be-obtained specific item in the first group information, information that needs to be obtained from the management function entity, in other words, determines a to-be-obtained specific item in second group information. The second group information may specifically include one or more of the following of the LAN group: the identifier of the customer, the external group identifier, the internal group identifier, a member list, a PDU session type, a DNN, slice information (for example, S-NSSAI), application information (for example, an application descriptor), or the like. For content of the second group information, refer to the descriptions in the embodiment shown in FIG. 1A. Details are not described herein again. For example, if the charging enablement function entity determines that the quantity of members in the LAN group needs to be obtained, the charging enablement function entity further determines that the member list of the LAN group needs to be obtained.

It should be understood that, alternatively, the charging enablement function entity may directly determine, based on the LAN service information (including the charging mode, the charging factor, and the like), the to-be-obtained specific item in the second group information. This is not limited in this disclosure. For example, the charging enablement function entity determines, based on content that the charging mode is the 2B charging and the charging factor includes the network-side charging factor, that the internal group identifier and the external group identifier of the LAN group need to be obtained (in other words, the to-be-obtained specific item in the second group information includes the internal group identifier and the external group identifier of the LAN group), and/or determines, based on content that the charging factor includes the quantity of members, that the member list of the LAN group needs to be obtained (in other words, the to-be-obtained specific item in the second group information includes the member list of the LAN group).

201: The charging enablement function entity sends a first message to the management function entity, where the first message is used to request to obtain the second group information of the LAN group.

Specifically, the first message carries the external group identifier of the LAN group, the internal group identifier of the LAN group, and/or the identifier of the customer subscribing to the LAN service, to indicate to request information about the LAN group. For example, the external group identifier, the internal group identifier, and/or the identifier of the customer are/is used as a key (key) to request the corresponding second group information from the management function entity.

In an optional manner, the charging enablement function entity sends the first message to the management function entity based on the LAN service information. Specifically, the charging enablement function entity may obtain the external group identifier of the LAN group and/or the identifier of the customer from the LAN service information, and carry the external group identifier of the LAN group and/or the identifier of the customer in the first message. The charging enablement function entity determines the to-be-obtained specific item in the second group information (refer to the descriptions of step 200, and details are not described again) based on the charging mode and/or the charging factor in the LAN service information. Correspondingly, the first message may further indicate the to-be-obtained specific item in the second group information (in other words, the first message indicates to request to obtain content specifically included in the second group information). For example, the first message carries a parameter "Internal Group ID" to indicate to request to obtain the internal group identifier (in other words, request to obtain a value of the parameter "Internal Group ID"). For another example, the first message carries a parameter "SUPI list" to indicate to request to obtain the member list (in other words, request to obtain a value of the parameter "SUPI list"). The charging enablement function entity may alternatively send the first message based on the effective time in the LAN service information, for example, determine, based on the effective time in the LAN service information, when to start charging, and then send the first message before starting charging.

The first message may be specifically an information obtaining request message, for example, a Nudm_SDM_Get service message or a Nnef_SDM_Get service message. The first message may also be referred to as a (LAN/VN) group information obtaining request message. Optionally, if the first message is used to request to obtain the correspondence between the external group identifier and the internal group identifier of the LAN group, the first message may alternatively be referred to as a group identifier correspondence obtaining request; if the first message is used to request to obtain the member list of the LAN group, the first message may alternatively be referred to as a member list obtaining request; or the like. This is not limited in this disclosure.

202: After receiving the first message, the management function entity obtains the second group information of the LAN group.

Specifically, the management function entity obtains the corresponding second group information based on the external group identifier, the internal group identifier, and/or the identifier of the customer that are/is carried in the first message. For example, the management function entity parses the first message to obtain the key in the first message, and obtains the corresponding second group information based on the key.

The management function entity may obtain the second group information based on an indication of the first message. For example, if the first message carries the external group identifier of the LAN group, and the first message further indicates to request to obtain the correspondence between the external group identifier and the internal group identifier of the LAN group, the management function entity obtains the internal group identifier corresponding to the external group identifier. For another example, if the first message further indicates to request to obtain the member list of the LAN group, the management function entity further obtains the member list corresponding to the external group identifier. It should be understood that the first message may not indicate a specific requested item in the second group information. In this case, the management function entity obtains all related information of the LAN group, or some important related information such as the external group identifier, the internal group identifier, and the member list. Therefore, in step 200, determining the to-be-obtained specific item in the second group information is optional.

The management function entity may obtain the second group information in the following plurality of manners.

In an optional manner, if the management function entity stores the second group information, the management function entity reads the corresponding second group information from a memory based on the key carried in the first message. The management function entity may be specifically an entity integrating a data management function and a data repository function. In addition, the management function entity may alternatively be replaced with a data repository service function entity. In other words, the management function entity in this embodiment of this disclosure is replaced with the data repository service function entity.

In another optional manner, the management function entity may obtain the second group information from a data repository service function entity. Specifically, the management function entity queries the data repository service function entity based on the key, to obtain the second group information. The management function entity may be specifically a data management function entity, an exposure function entity, a session management function entity, or the like.

In still another optional manner, the management function entity may obtain the second group information from another management function entity. For ease of description, the management function entity is referred to as a first management function entity, and the another management function entity is referred to as a second management function entity. Specifically, the first management function entity sends a fourth message to the second management function entity to obtain the second group information, where the fourth message is similar to the first message. For specific content, refer to the foregoing descriptions. Details are not described again. After receiving the fourth message, the second management function entity obtains the second group information, and returns the second group information to the first management function entity. The first management function entity may be specifically an exposure function entity, a session management function entity, or the like. The second management function entity may be specifically a data management function entity.

203: The management function entity sends a second message to the charging enablement function entity, where the second message carries the second group information of the LAN group.

The management function entity sends the obtained second group information to the charging enablement function entity.

The second message may be specifically a response message of the information obtaining request message, for example, a response message of a Nudm_SDM_Get service or a response message of a Nnef_SDM_Get service.

204: The charging enablement function entity determines the first group information of the LAN group based on the second group information of the LAN group.

The charging enablement function entity receives the second message to obtain the second group information carried in the second message, and further obtain the first group information based on the second group information.

In an optional manner, the charging enablement function entity determines the to-be-obtained specific item in the first group information based on the LAN service information. For specific content, refer to the descriptions of step 200. Details are not described again. It should be understood that an execution sequence of determining the to-be-obtained specific item in the first group information in step 200 is optional, for example, is executed before the first group information is obtained.

Optionally, the charging enablement function entity may select, as the first group information, content (a specific item) available for charging from the second group information. A selection basis is the LAN service information or the to-be-obtained specific item in the first group information.

Optionally, the charging enablement function entity directly uses the second group information as the first group information. For example, if the second group information received by the charging enablement function entity includes the external group identifier and the internal group identifier, the charging enablement function entity directly sends the external group identifier and the internal group identifier as the first group information to a charging processing function entity without performing processing. Therefore, step 204 is not a necessary step in this embodiment of this disclosure.

Optionally, the charging enablement function entity uses the second group information and other information (for example, part or all of content in the LAN service information) as the first group information. For example, in step 200, the LAN service information received by the charging enablement function entity includes the identifier of the customer and the external group identifier of the LAN group. In step 201 to step 203, the charging enablement function entity requests, based on the external group identifier, to obtain the corresponding internal group identifier (the second group information) from the management function entity. In step 204, the first group information determined by the charging enablement function entity includes the identifier of the customer, the external group identifier, and the internal group identifier in the LAN service information. In addition, the other information may further include time information, a description of a current report of the first group information (for example, an initial report (indicating that the current report is the first report for the LAN group), or an update report (indicating that the current report is an update report for the LAN group)), and the like.

Optionally, the charging enablement function entity processes the second group information to obtain the first group information. For example, the charging enablement function entity determines the quantity of members in the LAN group based on the member list of the LAN group.

205: The charging enablement function entity sends a third message to the charging processing function entity, where the third message carries the first group information of the LAN group.

Specifically, the charging enablement function entity may send the first group information to the charging processing function entity based on an event, for example, by using a post event charging (Post Event Charging, PEC) method. The charging enablement function entity may alternatively send the first group information to the charging processing function entity based on a charging resource. For example, the charging enablement function entity sends a request to the charging processing function entity to establish the charging resource (for example, a charging session), and sends the first group information to the charging processing function entity by using the charging resource after the charging resource is established. It should be understood that the charging enablement function entity may alternatively send the first group information to the charging processing function entity based on an event by using the charging resource.

The charging enablement function entity triggers charging by using a Nchf service. In this case, the charging processing function entity serves as a charging service provider (Provider), and the charging enablement function entity serves as a charging service consumer (Consumer). The third message may be specifically a charging request, for example, a request message of Nchf_ConvergedCharging_Create.

Optionally, a service URL of the charging processing function entity is preconfigured on the charging enablement function entity. Optionally, the operation management function entity configures the charging processing function entity for the LAN service. Therefore, the LAN service information may carry a service address of the charging processing function entity, and the charging enablement function entity obtains the service address of the charging processing function entity based on the LAN service information. Optionally, the charging enablement function entity queries a network resource manager (Network Resource Manager, NRM) for the service URL of the charging processing function entity based on the external group identifier of the LAN group. Then, the charging enablement function entity sends, to the charging processing function entity based on the service URL, the third message carrying the first group information.

206: The charging processing function entity performs charging based on the first group information of the LAN group.

Optionally, after receiving the third message, the charging processing function entity further returns the fourth message to the charging enablement function entity. The fourth message is used to respond to the third message. The fourth message may be specifically a charging response, or may be referred to as a charging data response, a (LAN/VN) group charging data response, a (LAN/VN) service charging data response, or the like.

After receiving the third message, the charging processing function entity obtains the first group information carried in the third message, to further perform charging for the LAN group (in other words, performs charging for the LAN service) based on the first group information.

The charging processing function entity may generate a charging data record of the LAN group based on the first group information. The charging data record of the LAN group may also be referred to as a charging data record of a VN group, a charging data record of a LAN/VN service, a charging data record of the customer, or the like. Specifically, the charging data record of the LAN group includes the first group information.

The charging data record of the LAN group may include the external group identifier of the LAN group. For a function of the external group identifier for implementing the 2B charging, refer to the descriptions of step 200. For example, the external group identifier is associated with the customer to which the LAN group belongs and the internal group identifier of the LAN group, to charge the customer. The external group identifier may be associated with various information such as account information of the customer, invocation information (for example, a quantity of times of invoking an application programming interface (Application Programming Interface, API)) on a network exposure function (NEF), and/or the network-side charging information of the LAN group, to support the 2B charging.

The charging data record of the LAN group may further include the internal group identifier of the LAN group. The internal group identifier may be associated with the network-side charging information. The network-side charging information includes, but is not limited to, the traffic usage, the duration usage, and/or the quantity of connections. The charging processing function entity associates the network-side charging information of the LAN group based on the internal group identifier. Specifically, the charging processing function entity receives the fragmented network-side charging information sent by the core network element, for example, charging information (at a granularity of a rating group (Rating Group, RG)) that is collected based on the PDU session and that is sent by the SMF network element, and the charging processing function entity associates, based on the internal group identifier, fragmented charging information related to the LAN group. It should be understood that the associated network-side charging information may alternatively be directly written into the charging data record of the LAN group, or written into a processed charging data record of the LAN group.

In addition, the correspondence between the external group identifier and the internal group identifier may be further used for execution of policy control. Specifically, the operation management function entity sends, to a policy control function entity (for example, a PCF network element), the charging processing function entity, and the like, information about a counter (counter), for example, an identifier of the counter, a state of the counter, and/or an identifier of a LAN group (or a customer subscribing to the LAN service) corresponding to the counter (indicating which LAN groups (or customers) use which counters). The identifiers mentioned herein may be specifically the external group identifier and/or the identifier of the customer. In this way, the information about the counter includes the external group identifier of the LAN group and/or the identifier of the customer. As described above, the charging processing function entity associates information such as the traffic usage and the duration usage of the LAN group based on the internal group identifier, to determine total traffic usage and total duration usage of the LAN group. Further, the charging processing function entity determines the corresponding state of the counter based on the correspondence between the external group identifier and the internal group identifier, or the charging processing function entity determines the corresponding state of the counter based on the correspondence between the external group identifier and the internal group identifier and the correspondence between the external group identifier and the identifier of the customer. Therefore, when the state of the counter changes, the charging processing function entity can send a changed state of the counter and the internal group identifier of the LAN group to the policy control function entity, so that the policy control function entity executes, based on the changed state of the counter, policy control on the PDU session of the LAN group corresponding to the internal group identifier.

The charging data record of the LAN group may further include the quantity of members in the LAN group. The quantity of members in the LAN group may be used to calculate, in a charging period, an average quantity of users, a maximum quantity of users, duration in which a quantity of members in the LAN group exceeds a specific scale, and/or the like, to meet various charging requirements. The quantity of members in the LAN group may be used to determine a corresponding charging rate. For example, different group scales correspond to different charging rates, and the charging processing function entity determines the corresponding charging rate based on the quantity of members in the LAN group. The charging data record of the LAN group may further include other information, for example, the PDU session type, the DNN, the slice information (for example, the S-NSSAI), and the application information (for example, the application descriptor). The information may also assist the charging processing function entity in performing charging processing. For example, the S-NSSAI is used to determine a slice corresponding to the LAN group, to facilitate association of slice charging information; the PDU session type is used to determine whether layer 2 switching or layer 3 switching is used; and the application information is used to determine an application supported by the LAN service.

The charging data record of the LAN group may be further used to further support 2B charging processing, for example, perform 2B rating and billing. This is not limited in this disclosure. Specifically, complete customer information (for example, account information of the customer and information about the LAN service to which the customer subscribes) and the network-side charging information of the LAN group may be obtained through association based on the correspondence between the external group identifier of the LAN group and the internal group identifier of the LAN group, to support the 2B charging.

In the technical solution, the charging enablement function entity obtains the first group information of the LAN group and sends the first group information to the charging processing function entity, and the charging processing function entity performs charging based on the first group information, to implement charging at a granularity of the LAN group and meet a charging requirement of the LAN service. The management function entity provides the second group information of the LAN group for the charging enablement function entity, so that the charging enablement function entity determines the first group information based on the second group information. This helps implement charging for the LAN service.

Figure 3:
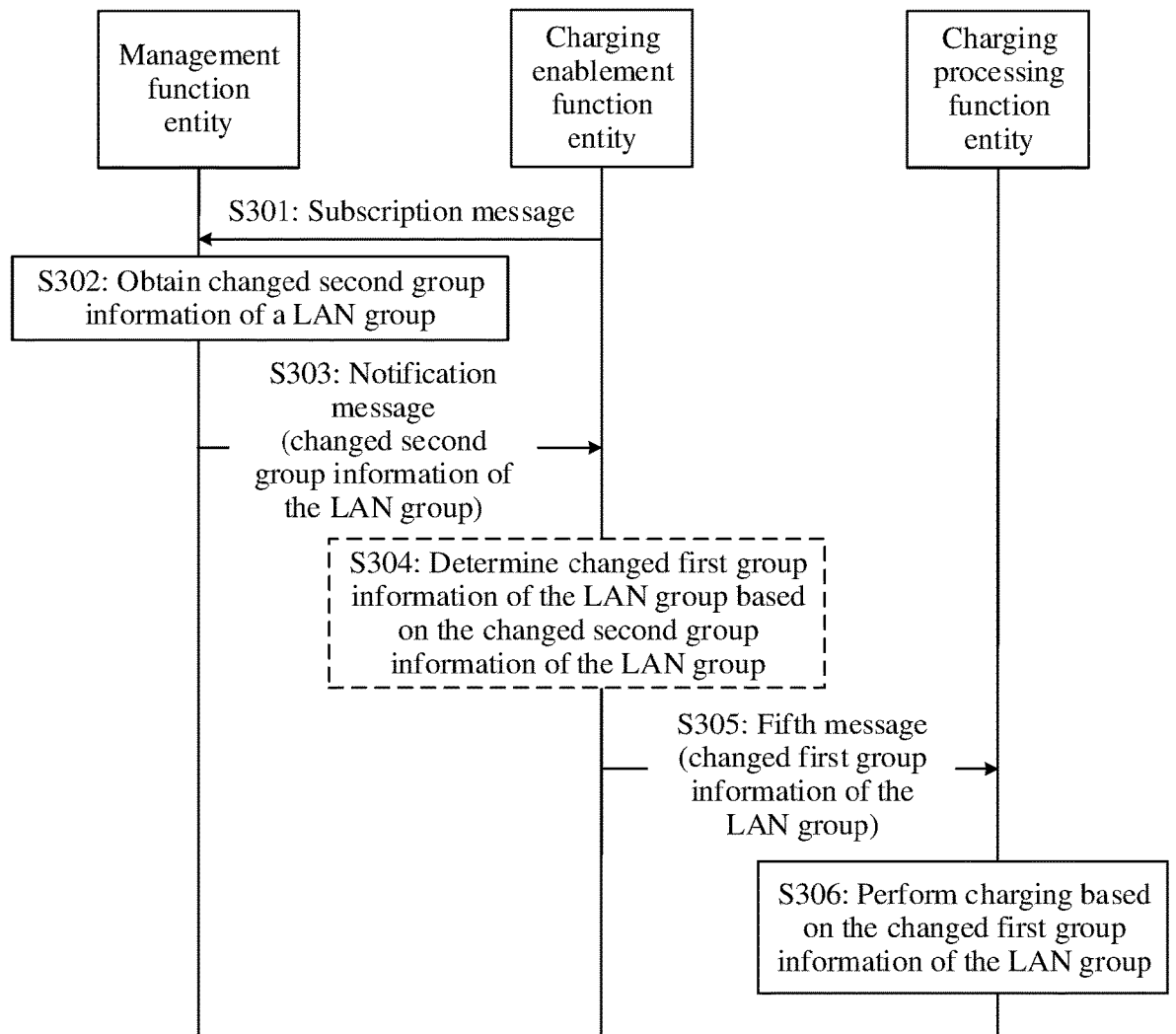
FIG. 3 is a flowchart of another group charging method according to an embodiment of this disclosure.

In this disclosure, in an optional method, a charging enablement function entity subscribes to a change of a LAN group from a management function entity, so that when the LAN group changes, the charging enablement function entity receives a notification of the change of the LAN group. The charging enablement function entity may further provide the change of the LAN group for a charging processing function entity, so that the charging processing function entity performs precise charging for a LAN service. A procedure of the method is shown in FIG. 3. FIG. 3 shows another group charging method according to this disclosure. The method may be applied to the system shown in FIG. 1, or may be applied to another future communication system. Specific steps of the method are as follows:

301: The charging enablement function entity sends a subscription message to the management function entity, where the subscription message is used to subscribe to a notification of a change of second group information of the LAN group.

Specifically, the subscription message carries an external group identifier of the LAN group, an internal group identifier of the LAN group, and/or an identifier of a customer to which the LAN group belongs, to indicate to subscribe to a change of the LAN group. For example, the external group identifier, the internal group identifier, and/or the identifier of the customer are/is used as a key to request the management function entity to create a subscription. The charging enablement function entity sends the subscription message by using a service provided by the management function entity.

For details about the second group information of the LAN group, refer to the descriptions in the embodiments shown in FIG. 1A and FIG. 2. Details are not described herein again.

In an optional manner, the subscription message indicates to subscribe to a specific item in the second group information of the LAN group. For example, the subscription message specifically indicates to subscribe to a notification of a member change of the LAN group.

In an optional manner, before sending the subscription message, the charging enablement function entity further determines that the notification of the change of the second group information of the LAN group needs to be subscribed to. The charging enablement function entity may perform determining based on LAN service information. For details about the LAN service information, refer to the descriptions in the embodiments shown in FIG. 1A and FIG. 2. Details are not described herein again. For example, the charging enablement function entity determines, based on the LAN service information (for example, a charging factor including a quantity of members), that the notification of the member change of the LAN group needs to be subscribed to. Specifically, the charging enablement function entity determines that the quantity of members in the LAN group is required for charging for the LAN service, and therefore the charging enablement function entity needs to obtain the member change of the LAN group. In this case, a charging processing function entity calculates the quantity of members in a charging period according to a charging rule.

Specifically, the subscription message may be a Nudm_EventExposure_Subscribe message, a Nudr_EventExposure_Subscribe message, a Nudm_SDM_Subscribe_request message, a Nudr_SDM_Subscribe_request message, a Nnef_SDM_Get service message, or the like. The subscription message may alternatively be referred to as a (LAN/VN) group subscription message, or the like. Optionally, if the subscription message is used to request to subscribe to the member change of the LAN group, the subscription message may alternatively be referred to as a (LAN/VN) group member subscription message, or the like. This is not limited in this disclosure.

302: The management function entity obtains changed second group information of the LAN group.

The management function entity receives the subscription message. For example, the management function entity parses the subscription message to obtain a key in the subscription message, and determines the subscribed LAN group based on the key. Optionally, the management function entity further returns a subscription success message to the charging enablement function entity.

In an optional manner, the management function entity alternatively sends a subscription message to another function entity. For ease of description, the subscription message received by the management function entity is referred to as a first subscription message, and the subscription message sent by the management function entity to the another function entity is referred to as a second subscription message. The second subscription message is similar to the first subscription message, and details are not described herein again.

Specifically, management of the LAN group includes creation/update/deletion of the LAN group, where the update of the LAN group includes dynamic management (for example, addition/deletion/modification) of the members in the LAN group, and the like. The management of the LAN group enables the second group information of the LAN group to change. For example, the second group information of the LAN group is created or the specific item in the second group information of the LAN group changes (for example, a member list changes). An operation management function entity and an application function entity may implement the management of the LAN group. For specific content, refer to the descriptions in the embodiment shown in FIG. 1A. Details are not described herein again.

The management function entity may obtain the changed second group information of the LAN group in the following plurality of manners.

In an optional manner, the operation management function entity sends a LAN group management request (which may be specifically a creation request, an update request, or a deletion request) to the management function entity; and/or the application function entity sends the LAN group management request to the management function entity by using an exposure function entity. Further, the management function entity manages, based on the management request, information stored in a data repository service function entity, to obtain the changed second group information of the LAN group. The management function entity may be specifically a data management function entity.

In another optional manner, the management function entity receives a notification message sent by another function entity, where the notification message carries the changed second group information of the LAN group, and therefore the management function entity obtains the changed second group information. The management function entity may be specifically an exposure function entity, a session management function entity, or the like, and the another function entity may be specifically a data management function entity or a data repository service function entity.

In still another optional manner, the management function entity is replaced with a data repository service function entity. In other words, the management function entity in this embodiment of this disclosure is replaced with the data repository service function entity. In this case, the data repository service function entity receives a LAN group management request sent by the another function entity, and updates, based on the management request, the second group information of the LAN group stored in the data repository service function entity, to obtain the changed second group information of the LAN group.

It should be understood that the changed second group information of the LAN group may be specifically second group information (which may also be referred to as created second group information) obtained after the LAN group is created, second group information that is of the LAN group and that is obtained after the specific item changes, or the like.

303: The management function entity sends a notification message to the charging enablement function entity, where the notification message carries the changed second group information of the LAN group.

Specifically, the notification message may be a Nudm_EventExposure_Notify message, a Nudm_SDM_Notify message, a Nudr_DM_Notify message, or the like. The notification message is triggered by the change of the second group information of the LAN group.

If part of content (for example, a specific item: a member list) in the second group information of the LAN group changes, the notification message may carry all content in the changed second group information (in other words, the changed second group information of the LAN group is all specific items in the changed second group information), or may carry only the changed part of content (in other words, the changed second group information of the LAN group is some changed specific items, for example, a changed member list). In addition, the notification message may further carry the external group identifier of the LAN group, the internal group identifier of the LAN group, and/or the identifier of the customer, to indicate that the LAN group changes.

Optionally, the notification message further carries time information, to indicate when the second group changes.

If the LAN group is newly created, the notification message is triggered when the LAN group is created (the second group information of the LAN group is created correspondingly). Optionally, the notification message further indicates that the LAN group is created, to notify the charging enablement function entity that the LAN group is newly created. For ease of description, the notification message is referred to as a first notification message. It should be understood that, in this case, the change of the second group information may be specifically that the second group information is created.

If members in the LAN group change, the notification message is triggered when the members in the LAN group change (in other words, the member list in the second group information of the LAN group changes). Optionally, the notification message further indicates that the members in the LAN group change. It should be understood that a changed member list carried in the notification message may also indicate that the members in the LAN group change. For ease of description, the notification message is referred to as a second notification message.

304: The charging enablement function entity determines changed first group information of the LAN group based on the changed second group information of the LAN group.

The charging enablement function entity receives the notification message to obtain the changed second group information carried in the notification message, and further obtain the first group information based on the changed second group information. Optionally, the charging enablement function entity further returns a response message to the management function entity to indicate that the notification message is received.

For a manner of determining the changed first group information of the LAN group based on the changed second group information of the LAN group, refer to the descriptions of step 204 in the embodiment shown in FIG. 2. For example, the second group information of the LAN group in step 204 is replaced with the changed second group information of the LAN group, and the first group information of the LAN group is replaced with the changed first group information of the LAN group. Details are not described again.

The following provides detailed descriptions by using two examples of the change of the LAN group.

If the LAN group is newly created, the charging enablement function entity obtains, by receiving the first notification message, the second group information of the LAN group carried in the first notification message. Further, the charging enablement function entity determines the first group information of the LAN group based on the second group information of the LAN group, where the first group information may further include time information and a description (for example, an initial report) for a current report of the first group information. In an optional manner, before step 301, the charging enablement function entity sends a first message (carrying an identifier of a customer) to the management function entity to request to obtain second group information of the LAN group. After receiving the first message, the management function entity determines, based on the identifier of the customer, that no LAN group has been created for the customer (for example, no LAN group corresponding to the identifier of the customer can be found). In this case, the management function entity returns a sixth message, where the sixth message indicates that the LAN group is not created, and/or that the second group information fails to be obtained. Further, the charging enablement function entity subscribes to a change of the LAN group of the customer, so that when the LAN group of the customer is created, the charging enablement function entity can obtain the second group information of the created LAN group in time.

If part of content (for example, a specific item: a member list) in the second group information of the LAN group changes, the changed second group information may include only the changed specific item (for example, the member list). It should be understood that, in this case, the changed second group information may further carry the external group identifier of the LAN group, the internal group identifier of the LAN group, and/or the identifier of the customer, to indicate that the LAN group changes, even if these identifiers do not change in this disclosure; or the changed second group information may include both the changed specific item and another unchanged specific item (for example, a PDU session type).

When the changed second group information includes only the changed specific item, the changed first group information may also include only the changed specific item.

When the changed second group information includes both the changed specific item and another unchanged specific item, the changed first group information may include only the changed specific item, or may include both the changed specific item and the another unchanged specific item.

Similarly, regardless of which case, the changed first group information may further carry the external group identifier of the LAN group, the internal group identifier of the LAN group, and/or the identifier of the customer, to indicate that the LAN group changes.

If the members in the LAN group change, the charging enablement function entity obtains a changed member list of the LAN group by receiving the second notification message. The charging enablement function entity determines a changed quantity of members in the LAN group based on the changed member list of the LAN group. The charging enablement function entity uses the changed quantity of members as the changed first group information of the LAN group. In addition, the changed first group information of the LAN group may further include time information and a description (for example, an update report) for a current report of the first group information.

Optionally, the charging enablement function entity further determines whether to send the changed quantity of members in the LAN group to the charging processing function entity. Specifically, the charging enablement function entity may perform determining based on the charging factor in the LAN service information. For example, when the charging factor is a maximum quantity of members (which may also be referred to as a maximum quantity of users), the charging enablement function entity determines whether the changed quantity of members in the LAN group is greater than the quantity of members in the LAN group before the change. If the changed quantity of members is greater than the quantity of members before the change, the charging enablement function entity further sends the changed quantity of members in the LAN group to the charging processing function entity. If the changed quantity of members is not greater than the quantity of members before the change, the charging enablement function entity does not need to send the changed quantity of members in the LAN group to the charging processing function entity this time. For another example, when the charging factor is an average quantity of members (which may also be referred to as an average quantity of users), the charging enablement function entity sends the changed quantity of members in the LAN group to the charging processing function entity, and therefore the charging processing function entity calculates the average quantity of members in the LAN group in the charging period.

305: The charging enablement function entity sends a fifth message to the charging processing function entity, where the fifth message carries the changed first group information of the LAN group.

For specific content, refer to the descriptions of step 205 in the embodiment shown in FIG. 2. For example, the third message in step 205 is replaced with the fifth message, and the first group information of the LAN group is replaced with the changed first group information of the LAN group. Details are not described again.

306: The charging processing function entity performs charging based on the changed first group information of the LAN group.

Optionally, after receiving the fifth message, the charging processing function entity further returns the sixth message to the charging enablement function entity. The sixth message is used to respond to the fifth message. For details about the fifth message, refer to the fourth message in step 206 in the embodiment shown in FIG. 2. Details are not described again.

After receiving the fifth message, the charging processing function entity obtains the changed first group information of the LAN group carried in the fifth message, and then performs charging based on the changed first group information.

If the LAN group is newly created, for a specific charging operation, refer to step 206 in the embodiment shown in FIG. 2. Details are not described herein again.

If the LAN group is updated (for example, the quantity of members changes), the charging processing function entity generates a charging data record of the LAN group based on the changed first group information. For ease of description, a charging data record generated based on the first group information before the change is referred to as a first charging data record, and the charging data record generated based on the changed first group information is referred to as a second charging data record. Specifically, the second charging data record may be a new charging data record independent of the first charging data record, or may be a charging data record obtained by adding the changed first group information to the first charging data record (for example, the changed first group information is used as additional data of the first charging data record). It should be understood that the second charging data record may include the changed first group information, for example, the external group identifier of the LAN group, the internal group identifier of the LAN group, and the changed quantity of members in the LAN group. For a specific function of the second charging data record, refer to the descriptions of the charging data record in step 206 in the embodiment shown in FIG. 2. Details are not described herein again.

Further, the charging processing function entity may further associate charging data records of the LAN group in the charging period, to generate 2B charging information of the LAN group in the charging period. For example, charging data records in the charging period are determined based on the time information, and the charging data records of the LAN group are determined based on the external group identifier and/or the internal group identifier. The 2B charging information may be used to further support 2B charging processing, for example, perform 2B rating and billing. This is not limited in this disclosure.

It should be understood that the solution in the embodiment shown in FIG. 3 and the solution in the embodiment shown in FIG. 2 may be combined with each other. For example, step 301 is performed after step 201, or step 301 is performed after step 203. The solution in the embodiment shown in FIG. 3 may alternatively be independent. For example, the charging enablement function entity sends the subscription message to the management function entity, so that when the LAN group is created, the charging enablement function entity can obtain the second group information by using the notification that is sent by the management function entity and that carries the second group information of the LAN group, and does not need to send the first message to request to obtain the second group information.

Figure 4:
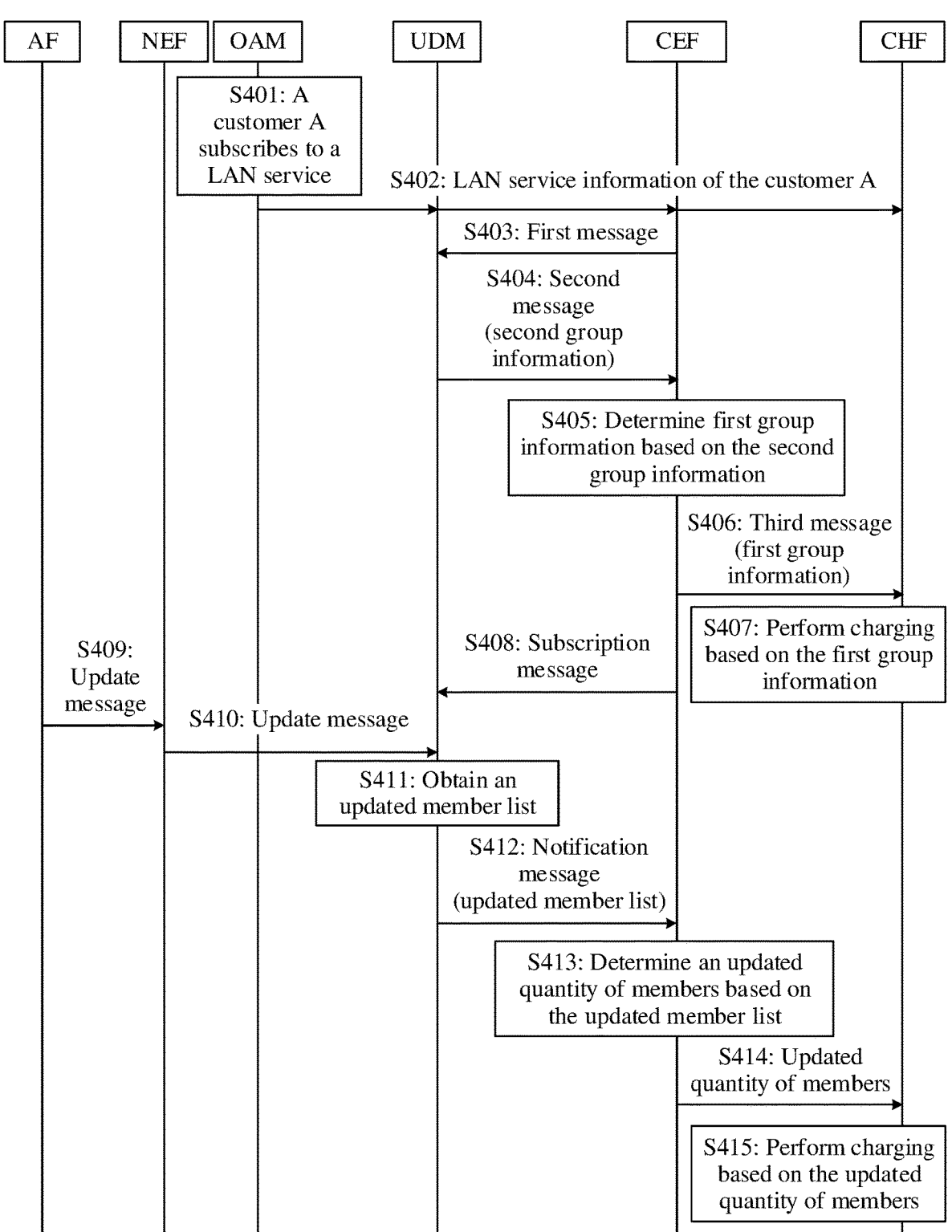
FIG. 4 is a flowchart of another group charging method according to an embodiment of this disclosure.

As shown in FIG. 4, the solutions in the embodiments shown in FIG. 2 and FIG. 3 are specifically described by using an example. Specifically, the LAN group charging method is described by using an example in which the application function entity is an AF network element, the exposure function entity is an NEF network element, the operation management function entity is an OAM system, the management function entity is a UDM network element, the charging enablement function entity is a CEF network element, and the charging processing function entity is a CHF network element. The method includes the following steps.

401: A customer A subscribes to a LAN service through the OAM system.

After the customer A subscribes to the LAN service, the OAM system creates a LAN group for the customer A. Specifically, the OAM system allocates an external group identifier to the LAN group. In addition, the OAM system further determines LAN service information of the customer A based on information provided by the customer A during the subscription. For example, the LAN service information of the customer A is as follows:

| Parameter | Value |
|---|---|
| Identifier of the customer A | 135****** |
| External group identifier | External-001 |
| Charging mode | 2B |
| Charging factor | Quantity of users and connections |
| Effective time | Oct. 7, 2020 |
| . . . | . . . |

402: The OAM system sends the LAN service information to other network elements.

Specifically, the OAM system sends the LAN service information to the UDM network element, the CEF network element, and/or the CHF network element. In an optional manner, the OAM system separately sends, to these network elements, information that is related to these network elements and that is included in the LAN service information. For example, the OAM system sends charging-related information in the LAN service information to the CEF network element and the CHF network element.

403: The CEF network element sends a first message to the UDM network element to request second group information of the LAN group.

The CEF network element determines, based on the LAN service information that is sent by the OAM system and that is received in step 402, whether the second group information of the LAN group needs to be obtained. If the CEF network element determines that the second group information needs to be obtained, the CEF network element further determines, based on the LAN service information, that a specific item in the second group information needs to be obtained.

Specifically, the CEF network element determines, based on content that the charging mode is 2B charging and the charging factor includes a network-side charging factor such as the quantity of connections, that a correspondence between the external group identifier and an internal group identifier of the LAN group needs to be obtained. For example, because the charging factor includes the network-side charging factor, network-side charging information needs to be obtained from a core network during charging. For example, the network-side charging information such as the quantity of connections is obtained from an SMF network element. However, the core network element such as the SMF network element has only the internal group identifier of the LAN group, and the internal group identifier cannot be directly associated with the customer A. Therefore, charging cannot be performed for the customer A. In another example, the CEF network element determines, based on the LAN service information, that a state of a counter of the LAN group needs to be provided for a policy control function entity (for example, a PCF network element), so that the PCF network element can perform policy control on a PDU session of the LAN group. The counter corresponds to the external group identifier of the LAN group. However, the PCF network element, as the core network element, has only the internal group identifier of the LAN group. Therefore, the CEF network element determines that the correspondence between the external group identifier and the internal group identifier of the LAN group needs to be obtained, so that the state of the counter of the LAN group and the internal group identifier of the LAN group can be provided for the PCF network element.

The CEF network element may further determine, based on content in the LAN service information that the charging factor includes the quantity of users, that charging needs to be performed for the quantity of users, and therefore the CEF network element further determines that the quantity of members in the LAN group needs to be obtained. Further, the CEF network element may determine, based on a charging rule in the LAN service information, how to perform charging for the quantity of users, to determine whether a change of the quantity of members in the LAN group needs to be obtained. For example, if the charging rule to which the customer A subscribes is that charging is performed based on a group scale, and charging rates are classified into the following grades: a grade 1 (a quantity of members in the LAN group is less than 50), a grade 2 (a quantity of members in the LAN group ranges from 50 to 100), and a grade 3 (a quantity of members in the LAN group is greater than 100), the quantity of members in the LAN group and the change of the quantity of members need to be obtained. If the change of the quantity of members in the LAN group needs to be obtained, the CEF network element further sends a request to the UDM to subscribe to the change of the LAN group. For details, refer to step 408. Details are not described herein again.

Further, the CEF network element sends the first message to the UDM network element to request to obtain the second group information of the LAN group. The request message carries the external group identifier (External-001) of the LAN group as a key. For example, the request message uses the external group identifier of the LAN group as the key to request to obtain the corresponding internal group identifier.

404: The UDM network element returns a second message to the CEF network element.

Specifically, after receiving the first message, the UDM network element returns the second message based on the key carried in the first message, where the second message carries the second group information. For example, the UDM network element returns the correspondence between the external group identifier and the internal group identifier of the LAN group and/or a member list to the CEF network element based on the key. The returned second group information includes the following content:

| |
|---|
| External group identifier (external group identifier of the LAN group) |
| Internal group identifier (internal group identifier of the LAN group) |
| SUPI list (member list of the LAN group, where the SUPI is a subscription identifier) |

Further, the returned second group information may further include the following content:

| LAN group data | DNN (data network name of the LAN group) |
|---|---|
| (LAN group data) | S-NSSAI (slice information of the LAN group) |
| | PDUSession Types (PDU session type of the LAN group, for example, an IP type or an Ethernet type) |
| | AppDescriptors (application information of the LAN group, such as an application identifier) |

405: The CEF network element determines first group information of the LAN group based on the second group information.

After receiving the second group information, the CEF network element determines the first group information based on the second group information.

Specifically, the first group information may include the following content:

| |
|---|
| External group identifier |
| Internal group identifier |
| NumberofUEs (quantity of members in the LAN group) |

The quantity of members in the LAN group is obtained by the CEF network element through calculation based on the member list (the SUPI list) of the LAN group.

The first group information may further include the following content:

| LAN group data | DNN |
|---|---|
| | S-NSSAI |
| | PDUSession Types |
| | AppDescriptors |
| | Event (description for a current report, for example, an initial report) |
| | Timestamp (time information) |

For example, the first group information is as follows:
{
   Timestamp: 202010071632;
   External Group Identifier: External-001;
   Internal Group Identifier: 8779879987;
   NumberofUEs: 50;
   Event: initialReport;
   5G VN Group Data
   {
     S-NSSAI: slice1;
     PDUSession Type: Ethernet
   }
{
406: The CEF network element sends a third message to the CHF network element, where the third message carries the first group information.

407: The CHF network element performs charging based on the first group information.

Specifically, the CHF network element generates a charging data record, where the charging data record includes the first group information (for example, the external group identifier and the internal group identifier of the LAN group). The charging data record is used to support further 2B charging processing, such as 2B rating and billing.

Further, the CHF network element further obtains network-side charging information, for example, information such as traffic usage and the quantity of connections that is obtained from the SMF network element. The CHF network element associates the network-side charging information based on the internal group identifier of the LAN group, to obtain the network-side charging information of the LAN group. The CHF network element may further associate the identifier of the customer A based on the external group identifier, to obtain account information of the customer A. In this way, the CHF network element can generate complete 2B charging information based on the network-side charging information of the LAN group, the account information of the customer A, and the like.

408: The CEF network element sends a subscription message to the UDM network element.

The subscription message carries the external group identifier of the LAN group as the key, to invoke a service provided by the UDM network element to create a subscription. Specifically, the subscription message is used to subscribe to a notification of a change of the second group information of the LAN group.

It should be understood that sequence numbers of steps in this disclosure are examples, and do not constitute a limitation on an execution sequence of the steps. For example, step 408 may be performed after the CEF network element determines that the change of the quantity of members in the LAN group needs to be obtained in step 403.

409 and 410: The AF network element sends an update message to the UDM network element through the NEF network element, to update the member list of the LAN group.

Specifically, update of the member list of the LAN group includes: addition, deletion, and/or modification of the members in the LAN group.

411: The UDM network element obtains an updated member list of the LAN group.

412: The UDM network element sends a notification message to the CEF network element, where the notification message carries changed second group information of the LAN group, and the changed second group information includes the updated member list of the LAN group.

For example, the changed second group information includes the following content:

---
External group identifier (external group identifier of the LAN group)
Internal group identifier (internal group identifier of the LAN group)
SUPI list (updated member list of the LAN group)

---

In addition, the changed second group information may further include time information (for example, time of the change). The changed second group information may further include other unchanged content of the LAN group, for example, the LAN group data in step 404.

413: The CEF network element determines changed first group information of the LAN group based on the changed second group information.

Specifically, the CEF network element determines an updated quantity of members in the LAN group based on the updated member list. The CEF network element obtains the updated quantity of members in the LAN group through calculation based on the updated member list.

For example, the changed first group information of the LAN group includes the following content:

---
External group identifier (external group identifier of the LAN group)
Internal group identifier (internal group identifier of the LAN group)
NumberofUEs (updated quantity of members in the LAN group)

---

The changed first group information may further include time information, a description for a current report of the first group information (for example, an update report), and/or other unchanged content of the LAN group.

For example, the changed first group information may further include the following content:

---
| LAN group data | DNN |
| | S-NSSAI |
| | PDUSession Types |
| | AppDescriptors |
| Event (description for a current report, for example, an update report) | |
| Timestamp (time information) | |

---

For example, the changed first group information is as follows:

```
{
    Timestamp: 202010151632;
    External Group Identifier: External-001;
    NumberofUEs: 60;
    Event: UpdateReport;
}
```

414: The CEF network element sends the changed first group information (including the updated quantity of members in the LAN group) to the CHF network element.

415: The CHF network element performs charging based on the changed first group information.

For example, the CHF network element performs charging based on the updated quantity of members in the LAN group. The CHF network element writes the updated quantity of members into a charging data record (a new charging data record, or the charging data record in step 407). Further, the CHF network element may further determine a quantity of members in the LAN group in a charging period based on the updated quantity of members, to perform charging based on the quantity of members in the LAN group in the charging period. For example, the CHF network element determines, based on the time information, that on Oct. 15, 2020, a quantity of members in the LAN group (External-001) is 60, but the charging data record already records that on Oct. 7, 2020, a quantity of members in the LAN group (External-001) is 50. Therefore, the CHF network element obtains through calculation that in October in 2020, an average quantity of members in the LAN group (External-001) is 55. For other specific content, refer to the descriptions of step 407 and step 306 in the embodiment shown in FIG. 3. Details are not described herein again.

Figure 5A:
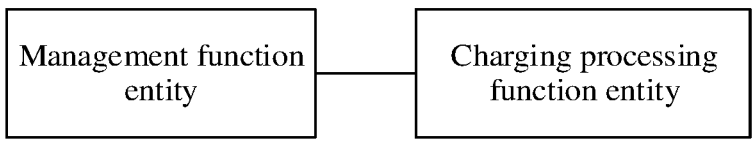
FIG. 5A is a schematic diagram of another possible network architecture according to an embodiment of this disclosure.

The following describes a schematic diagram of another possible network architecture according to an embodiment of this disclosure. FIG. 5A is a schematic diagram of a possible network architecture to which this embodiment of this disclosure is applicable. The network architecture may include devices such as a management function entity and a charging processing function entity. Different from the network architecture shown in FIG. 1A, in the network architecture provided in this embodiment of this disclosure, the charging processing function entity is further improved. In this way, the charging processing function entity has a function of obtaining second group information of a LAN group from the management function entity, and therefore a charging enablement function entity is not required for obtaining the second group information. Details are as follows:

The charging processing function entity is configured to process charging for a LAN service. Specifically, the charging processing function entity is configured to obtain first group information of the LAN group, and perform charging processing based on the first group information. In addition, the charging processing function entity is further configured to obtain the second group information of the LAN group from the management function entity, and determine the first group information based on the second group information. Optionally, the charging processing function entity may be further configured to subscribe to, from the management function entity, a notification of a change of the second group information of the LAN group, so that when the second group information changes, the management function entity sends the notification to the charging processing function entity. Optionally, the charging processing function entity is further configured to obtain LAN service information, and determine, based on the LAN service information, that the first group information and/or the second group information need/needs to be obtained. In a 5G communication system, for a case in which the charging processing function entity is a specific network element, refer to the descriptions of the charging processing function entity in the embodiment shown in FIG. 1A. Details are not described herein again.

The management function entity is configured to provide the second group information of the LAN group for the charging processing function entity. The management function entity may be further configured to receive a subscription message from the charging processing function entity for the notification of the change of the second group information, to update the second group information to the charging processing function entity in time. For another information about the management function entity, refer to the descriptions of the charging processing function entity in the embodiment shown in FIG. 1A. Details are not described herein again.

It should be understood that the management function entity may alternatively be replaced with a data repository service function entity. To be specific, the charging processing function entity obtains the second group information of the LAN group from the data repository service function entity, and the data repository service function entity stores the second group information and sends the second group information to the charging processing function entity. In this case, the data repository service function entity may be further configured to receive the subscription message from the charging processing function entity for the notification of the change of the second group information, to update the second group information to the charging processing function entity in time.

For details about the first group information of the LAN group, refer to the descriptions in the embodiment shown in FIG. 1A. Different from that in the embodiment shown in FIG. 1A, the first group information of the LAN group in this embodiment of this disclosure is not obtained by the charging enablement function entity and sent to the charging processing function entity, but is determined by the charging processing function entity based on the second group information.

For details about the second group information of the LAN group, refer to the descriptions in the embodiment shown in FIG. 1A. Different from that in the embodiment shown in FIG. 1A, the second group information of the LAN group in this embodiment of this disclosure is not sent by the management function entity to the charging enablement function entity, but is sent by the management function entity to the charging processing function entity.

Similar to that provided in the embodiment shown in FIG. 1A, the system architecture provided in this embodiment of this disclosure may further include an operation management function entity, an application function entity, and an exposure function entity (not shown in the figure). For specific content, refer to the descriptions in the embodiment shown in FIG. 1A. For example, the charging enablement function entity in the embodiment shown in FIG. 1A is replaced with the charging processing function entity. Details are not described herein again.

Figure 5B:
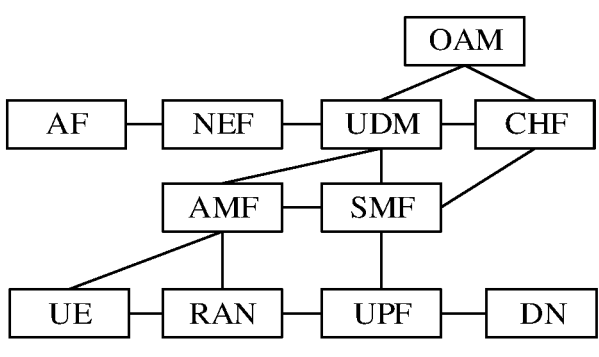
FIG. 5B is a schematic diagram of another possible network architecture according to an embodiment of this disclosure.

The 5G communication system is used as an example. FIG. 5B is a schematic diagram of a specific possible network architecture to which an embodiment of this disclosure is applicable. The network architecture may include UE, a RAN, a UPF network element, an AF network element, an NEF network element, an OAM system, a UDM network element, a CHF network element, an AMF network element, an SMF network element, and the like. For specific content, refer to the descriptions in the embodiment shown in FIG. 1B. Details are not described herein again. For example, the CEF network element in the embodiment shown in FIG. 1A is replaced with the CHF network element. To be specific, the CHF network element is configured to obtain second group information of a LAN group from the UDM network element, determine first group information of the LAN group based on the second group information, and perform charging based on the first group information.

Figure 6:
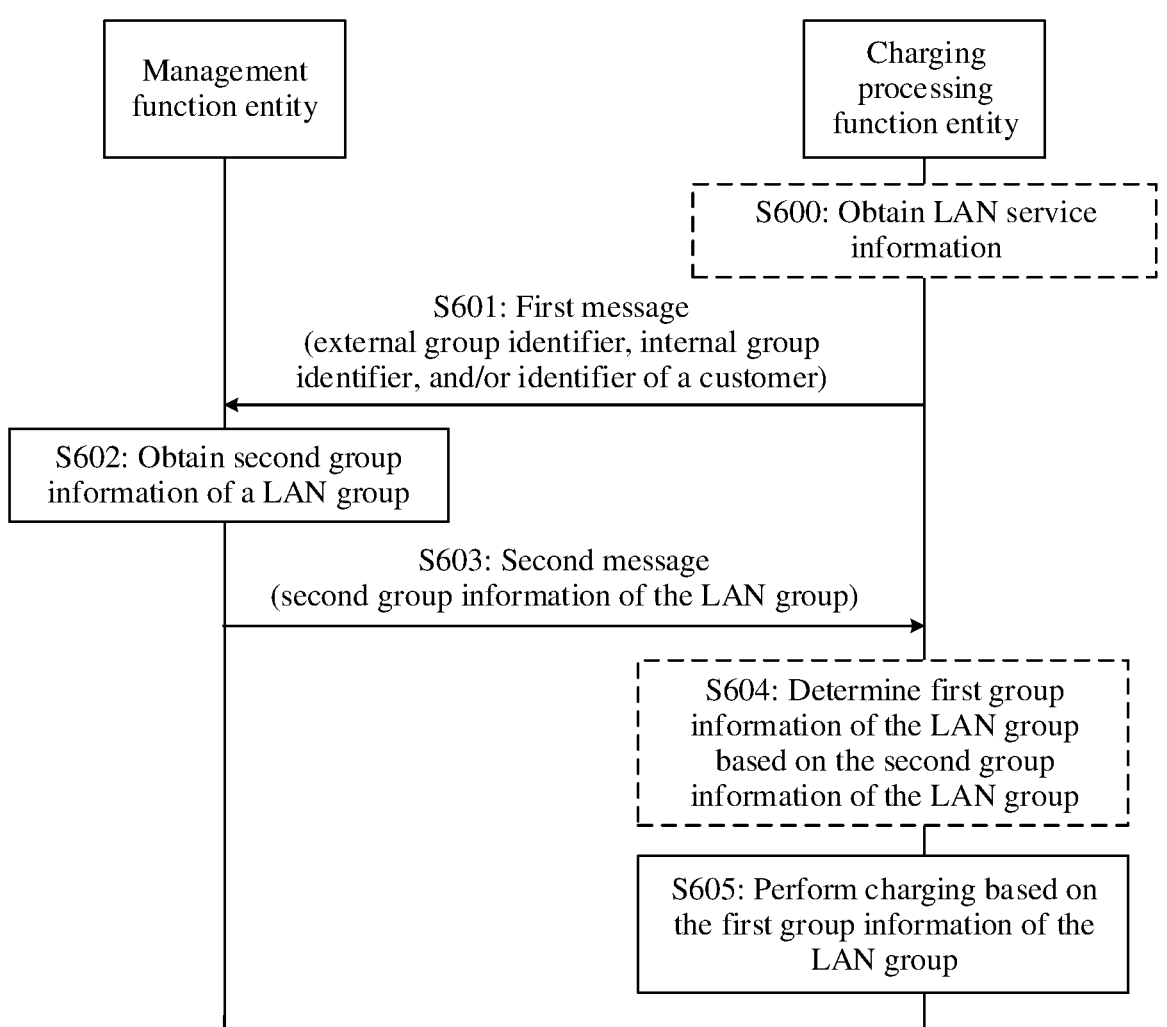
FIG. 6 is a flowchart of another group charging method according to an embodiment of this disclosure.

FIG. 6 shows another group charging method according to this disclosure. The method may be applied to the system shown in FIG. 5A or FIG. 5B, or may be applied to another future communication system. Specific steps of the method are as follows:

600: A charging processing function entity obtains LAN service information of a customer.

For specific content, refer to the descriptions of step 200 in the embodiment shown in FIG. 2. For example, the charging enablement function entity in step 200 is replaced with the charging processing function entity. Details are not described again.

601: The charging processing function entity sends a first message to the management function entity, where the first message is used to request to obtain the second group information of the LAN group.

Specifically, the first message carries an external group identifier of the LAN group, an internal group identifier of the LAN group, and/or an identifier of the customer subscribing to a LAN service, to indicate to request information about the LAN group. The external group identifier of the LAN group and/or the identifier of the customer may be obtained by the charging processing function entity from the LAN service information. In addition, the charging processing function entity may further obtain the internal group identifier of the LAN group from a core network element such as the SMF network element or a PCF network element. For example, for a PDU session of a member in the LAN group, when sending network-side charging information such as traffic usage or duration usage of the PDU session to the charging processing function entity, the SMF network element further sends the internal group identifier of the LAN group.

For other specific content, refer to the descriptions of step 201 in the embodiment shown in FIG. 2. For example, the charging enablement function entity in step 201 is replaced with the charging processing function entity. Details are not described again.

602: After receiving the first message, the management function entity obtains the second group information of the LAN group.

603: The management function entity sends a second message to the charging processing function entity, where the second message carries the second group information of the LAN group.

604: The charging processing function entity determines first group information of the LAN group based on the second group information of the LAN group.

For specific content of step 602 to step 604, refer to the descriptions of step 202 to step 204 in the embodiment shown in FIG. 2. For example, the charging enablement function entity in step 202 to step 204 is replaced with the charging processing function entity. Details are not described again.

605: The charging processing function entity performs charging based on the first group information of the LAN group.

For specific content of step 605, refer to the descriptions of step 206 in the embodiment shown in FIG. 2. For example, the charging enablement function entity in step 206 is replaced with the charging processing function entity. Details are not described again. In addition, this embodiment of this disclosure does not include the third message and the fourth message mentioned in step 206.

In the technical solution, the charging processing function entity performs charging based on the first group information, to implement charging at a granularity of the LAN group and meet a charging requirement of the LAN service. The management function entity provides the second group information of the LAN group for the charging processing function entity, so that the charging processing function entity determines the first group information based on the second group information. This helps implement charging for the LAN service. In addition, compared with the solution provided in the embodiment shown in FIG. 2, in the solution provided in this embodiment of this disclosure, the charging enablement function entity is not required, so that an interaction procedure is simpler and more efficient, but a higher requirement is also imposed on the charging processing function entity. For example, in the embodiment shown in FIG. 2, the charging processing function entity is a charging service provider (Provider), and does not need to invoke a service of the management function entity. However, in this embodiment of this disclosure, the charging processing function entity is not only a charging service provider (Provider), but also a service consumer (Consumer) of the management function entity. In other words, the charging processing function entity further invokes the service of the management function entity, for example, requests the second group information from the management function entity.

Figure 7:
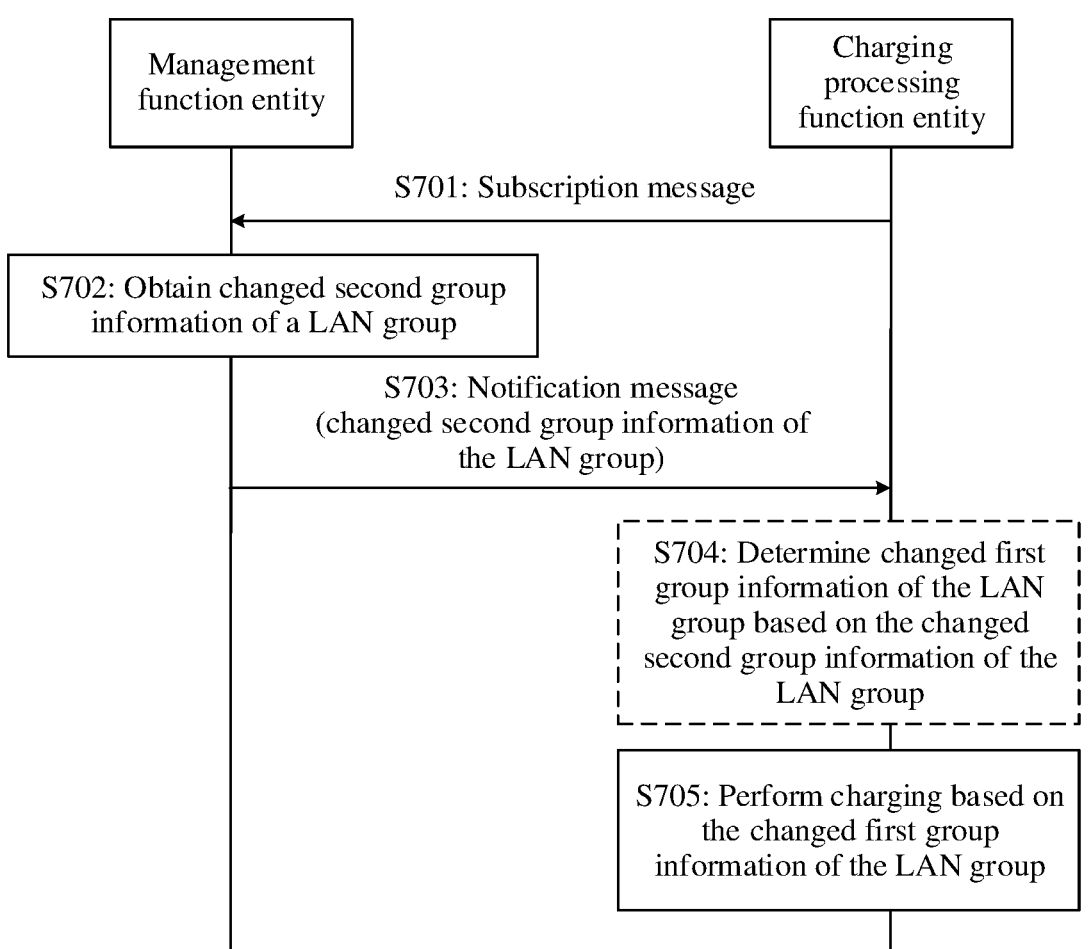
FIG. 7 is a flowchart of another group charging method according to an embodiment of this disclosure.

In an optional method, a charging processing function entity subscribes to a change of a LAN group from a management function entity, so that when the LAN group changes, the charging processing function entity receives a notification of the change of the LAN group, so that the charging processing function entity performs precise charging for a LAN service. A procedure of the method is shown in FIG. 7. FIG. 7 shows another group charging method according to this disclosure. The method may be applied to the system shown in FIG. 5A or FIG. 5B, or may be applied to another future communication system. Specific steps of the method are as follows:

701: The charging processing function entity sends a subscription message to the management function entity, where the subscription message is used to subscribe to a notification of a change of second group information of the LAN group.

702: The management function entity obtains changed second group information of the LAN group.

703: The management function entity sends a notification message to the charging processing function entity, where the notification message carries the changed second group information of the LAN group.

704: The charging processing function entity determines changed first group information of the LAN group based on the changed second group information of the LAN group.

705: The charging processing function entity performs charging based on the changed first group information of the LAN group.

For specific content of step 701 to step 704, refer to the descriptions of step 301 to step 304 in the embodiment shown in FIG. 3 respectively. For specific content of step 705, refer to the descriptions of step 306 in the embodiment shown in FIG. 3. For example, the charging enablement function entity in step 301 to step 304 and step 306 is replaced with the charging processing function entity. Details are not described again.

In an optional manner, the charging processing function entity further determines whether to perform charging based on a changed quantity of members of the LAN group. Specifically, the charging processing function entity may perform determining based on a charging factor in LAN service information. For example, when the charging factor is a maximum quantity of members (which may also be referred to as a maximum quantity of users), the charging processing function entity determines whether the changed quantity of members in the LAN group is greater than the quantity of members in the LAN group before the change. If the changed quantity of members is greater than the quantity of members before the change, the charging processing function entity performs charging based on the changed quantity of members in the LAN group. If the changed quantity of members is not greater than the quantity of members before the change, the charging processing function entity may discard the changed quantity of members. For another example, if the charging factor is an average quantity of members (which may also be referred to as an average quantity of users), the charging processing function entity calculates the average quantity of members of the LAN group in a charging period, and then performs charging based on the average quantity of members of the LAN group.

In an optional manner, the solution in the embodiment shown in FIG. 7 and the solution in the embodiment shown in FIG. 6 may be combined with each other. For example, step 701 is performed after step 601, or step 701 is performed after step 703.

In addition, compared with the solutions provided in the embodiments shown in FIG. 2 and FIG. 3, in the solutions in the embodiments shown in FIG. 6 and FIG. 7, the charging enablement function entity is not required, so that an interaction procedure is simpler and more efficient, but a higher requirement is also imposed on the charging processing function entity. For example, in the embodiments shown in FIG. 2 and FIG. 3, the charging processing function entity is a charging service provider (Provider), and does not need to invoke a service of the management function entity. However, in this embodiment of this disclosure, the charging processing function entity is not only a charging service provider (Provider), but also a service consumer (Consumer) of the management function entity. In other words, the charging processing function entity further invokes the service of the management function entity, for example, requests the second group information from the management function entity, or subscribes to the notification of the change of the second group information.

Figure 8:
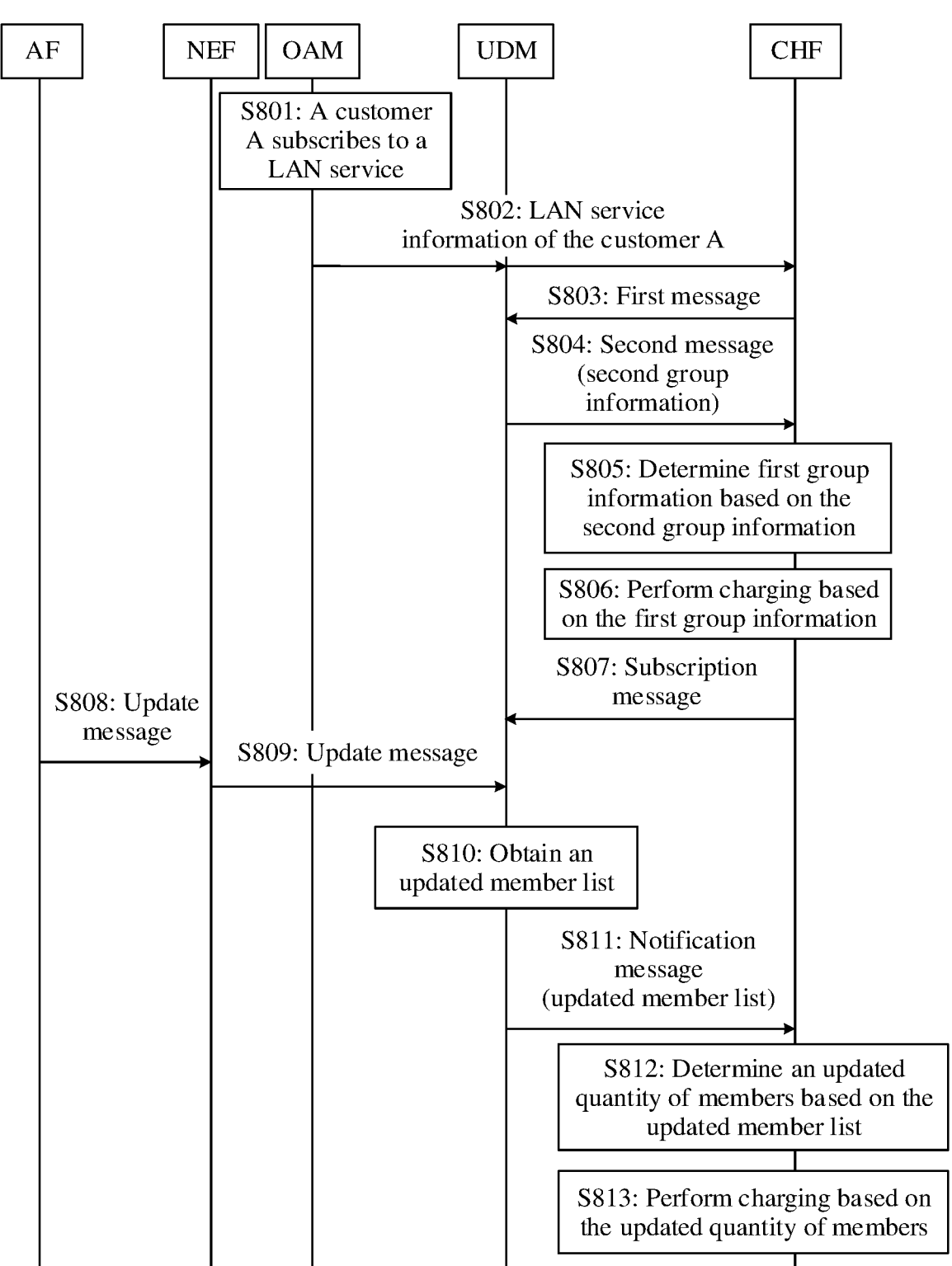
FIG. 8 is a flowchart of another group charging method according to an embodiment of this disclosure.

As shown in FIG. 8, the solutions in the embodiments shown in FIG. 6 and FIG. 7 are specifically described by using an example. Specifically, the LAN group charging method is described by using an example in which the application function entity is an AF network element, the exposure function entity is an NEF network element, the operation management function entity is an OAM system, the management function entity is a UDM network element, and the charging processing function entity is a CHF network element. The method includes the following steps.

801: A customer A subscribes to a LAN service through the OAM system.

802: The OAM system sends LAN service information to other network elements.

803: The CHF network element sends a first message to the UDM network element to request second group information of the LAN group.

804. The UDM network element returns a second message to the CHF network element, where the second message carries the second group information of the LAN group.

805: The CHF network element determines first group information of the LAN group based on the second group information.

806: The CHF network element performs charging based on the first group information.

807: The CHF network element sends a subscription message to the UDM network element.

808 and 809: The AF network element sends an update message to the UDM network element through the NEF network element, to update a member list of the LAN group.

810: The UDM network element obtains an updated member list of the LAN group.

811: The UDM network element sends a notification message to the CHF network element, where the notification message carries changed second group information of the LAN group, and the changed second group information includes the updated member list of the LAN group.

812: The CHF network element determines, based on the changed second group information (including the updated member list of the LAN group), changed first group information (including an updated quantity of members of the LAN group) of the LAN group.

813: The CHF network element performs charging based on the changed first group information (including the updated quantity of members of the LAN group).

For specific content of step 801 to step 805, refer to descriptions of step 401 to step 405 in the embodiment shown in FIG. 4 respectively. For specific content of step 806, refer to the descriptions of step 407 in the embodiment shown in FIG. 4. For specific content of step 807 to step 812, refer to the descriptions of step 408 to step 413 in the embodiment shown in FIG. 4. For specific content of step 813, refer to the descriptions of step 415 in the embodiment shown in FIG. 4. For example, the charging enablement function entity in step 401 to step 405, step 407, step 408 to step 413, and step 415 is replaced with the charging processing function entity. Details are not described again.

Figures 9, 10:
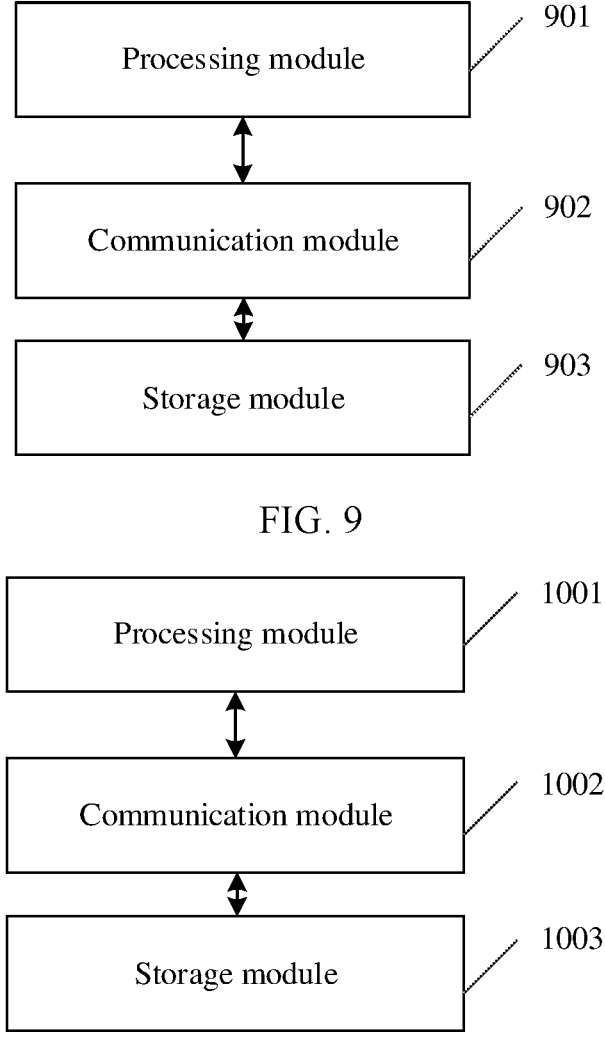
FIG. 9 is a schematic diagram of a structure of a charging processing function entity according to an embodiment of this disclosure.
FIG. 10 is a schematic diagram of a structure of a charging enablement function entity according to an embodiment of this disclosure.

FIG. 9 is a schematic diagram of a structure of a charging processing function entity according to an embodiment of this disclosure. The charging processing function entity has a function of implementing actions of the charging processing function entity and the CHF network element in the foregoing embodiments. Specifically, the charging processing function entity includes a processing module 901 and a communication module 902. The communication module 902 may specifically include a receiving module and a sending module. The processing module 901 is configured to control and manage the actions of the charging processing function entity. The communication module 902 is configured to support communication between the charging processing function entity and another device (for example, a charging enablement function entity and/or a management function entity). The charging processing function entity may further include a storage module 903, configured to store program code of the charging processing function entity, LAN group-related information (such as LAN service information, second group information, first group information, and/or a charging data record), and the like.

The processing module 901 may support the charging processing function entity in performing the actions of the charging processing function entity and the CHF network element in the foregoing method examples. For example, the processing module 901 may support the charging processing function entity in performing step 206 in FIG. 2, step 306 in FIG. 3, step 407 and step 415 in FIG. 4, step 604 and step 605 in FIG. 6, step 704 and step 705 in FIG. 7, and step 805 and step 806 and step 812 and step 813 in FIG. 8.

The communication module 902 may support communication between the charging processing function entity and the another device. For example, the communication module 902 may support the charging processing function entity in performing step 205 in FIG. 2, step 305 in FIG. 3, step 406 and step 414 in FIG. 4, step 600 and step 601 and step 603 in FIG. 6, step 701 and step 703 in FIG. 7, step 802 to step 804, step 807, and step 811 in FIG. 8.

It should be understood that the actions in the foregoing example are optional. Alternatively, the processing module 901 and the communication module 902 may selectively support the charging processing function entity in performing some of the actions.

Figure 12:
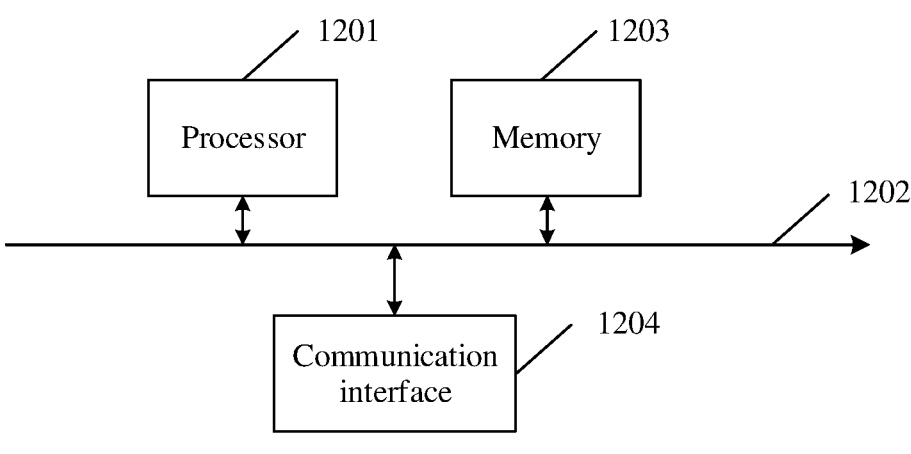
FIG. 12 is a schematic diagram of a structure of an apparatus according to an embodiment of this disclosure.

In a simple embodiment, a person skilled in the art may figure out that the charging processing function entity may be implemented in a form shown in FIG. 12.

FIG. 10 is a schematic diagram of a structure of a charging enablement function entity according to an embodiment of this disclosure. The charging enablement function entity has a function of implementing actions of the charging enablement function entity and the CEF network element in the foregoing embodiments. Specifically, the charging enablement function entity includes a processing module 1001 and a communication module 1002. The communication module 1002 may specifically include a receiving module and a sending module. The processing module 1001 is configured to control and manage the actions of the charging enablement function entity. The communication module 1002 is configured to support communication between the charging enablement function entity and another device (for example, a charging processing function entity and/or a management function entity). The charging enablement function entity may further include a storage module 1003, configured to store program code of the charging enablement function entity, LAN group-related information (such as LAN service information, second group information, and/or first group information), and the like.

The processing module 1001 may support the charging enablement function entity in performing the actions of the charging enablement function entity and the CEF network element in the foregoing method examples. For example, the processing module 1001 may support the charging enablement function entity in performing step 204 in FIG. 2, step 304 in FIG. 3, and step 405 and step 413 in FIG. 4.

The communication module 1002 may support communication between the charging enablement function entity and the another device. For example, the communication module 1002 may support the charging enablement function entity in performing step 200, step 201, step 203, and step 205 in FIG. 2, step 301, step 303, and step 305 in FIG. 3, and step 402 to step 404, step 406, step 408, step 412, and step 414 in FIG. 4.

It should be understood that the actions in the foregoing example are optional. Alternatively, the processing module 1001 and the communication module 1002 may selectively support the charging enablement function entity in performing some of the actions.

In a simple embodiment, a person skilled in the art may figure out that the charging enablement function entity may be implemented in a form shown in FIG. 12.

Figure 11:
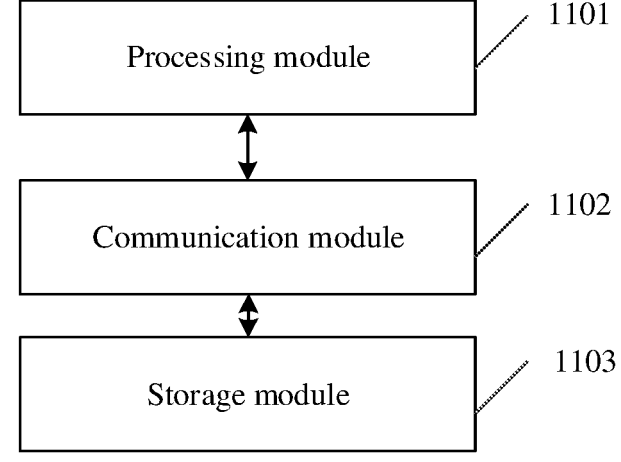
FIG. 11 is a schematic diagram of a structure of a management function entity or a data repository service function entity according to an embodiment of this disclosure.

FIG. 11 is a schematic diagram of a structure of a management function entity according to an embodiment of this disclosure. The management function entity has a function of implementing actions of the management function entity and the UDM network element in the foregoing embodiments. Specifically, the management function entity includes a communication module 1102. The communication module 1102 may specifically include a receiving module and a sending module. The communication module 1102 is configured to support communication between the management function entity and another device (for example, a charging processing function entity and/or a charging enablement function entity). The management function entity may further include a processing module 1101. The processing module 1101 is configured to control and manage the actions of the management function entity. The management function entity may further include a storage module 1103, configured to store program code of the management function entity, LAN group-related information (such as LAN service information, and/or second group information), and the like.

The communication module 1102 may support the management function entity in performing communication between each of the management function entity and the UDM network element and the another device in the foregoing method examples. For example, the communication module 1102 may support the management function entity in performing step 201 to step 203 in FIG. 2, step 301 to step 303 in FIG. 3, and step 402 to step 404 and step 411 in FIG. 4.

The processing module 1101 may support the management function entity in performing the actions of the management function entity and the UDM network element in the foregoing method examples, for example, controlling the communication module 1102 to perform communication.

It should be understood that the actions in the foregoing example are optional. Alternatively, the communication module 1102 may selectively support the management function entity in performing some of the actions.

In a simple embodiment, a person skilled in the art may figure out that the management function entity may be implemented in a form shown in FIG. 12.

It should be understood that an embodiment of this disclosure further provides a schematic diagram of a structure of a data repository service function entity. Similar to FIG. 11, the management function entity in the embodiment shown in FIG. 11 is replaced with the data repository service function entity. Details are not described again.

FIG. 12 is a schematic diagram of a structure of an apparatus 1200 according to an embodiment of this disclosure. The apparatus 1200 may be specifically a charging processing function entity, a charging enablement function entity, a management function entity, a data repository service function entity, or the like.

The apparatus 1200 may include at least one processor 1201, a communication bus 1202, a memory 1203, a communication interface 1204, and an I/O interface. The processor may be a general-purpose central processing unit (CPU), a microprocessor, an application-specific integrated circuit (application-specific integrated circuit, ASIC), or one or more integrated circuits for controlling program execution in the solutions in this disclosure. The communication bus may include a path for transmitting information between the foregoing components. The communication interface is any type of apparatus such as a transceiver, and is configured to communicate with another device or a communication network, for example, the Ethernet, a radio access network (RAN), or a wireless local area network (Wireless Local Area Network, WLAN).

The memory may be, but is not limited to, a read-only memory (read-only memory, ROM) or another type of static storage device capable of storing static information and instructions, a random access memory (random access memory, RAM) or another type of dynamic storage device capable of storing information and instructions, an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer. The memory may exist independently, and is connected to the processor through the bus. The memory may alternatively be integrated with the processor.

The memory is configured to store program code for executing the solutions in this disclosure, and the processor controls the execution. The processor is configured to execute the program code stored in the memory.

During specific implementation, the processor may include one or more CPUs, and each CPU may be a single-core (single-core) processor or a multi-core (multi-Core) processor. The processor herein may be one or more devices, circuits, and/or processing cores configured to process data (for example, computer program instructions).

During specific implementation, in an embodiment, the apparatus may further include the input/output (I/O) interface. For example, an output device may be a liquid crystal display (liquid crystal display, LCD), a light emitting diode (light emitting diode, LED) display device, a cathode ray tube (cathode ray tube, CRT) display device, or a projector (projector). An input device may be a mouse, a keyboard, a touchscreen device, a sensing device, or the like.

It should be noted that the structure shown in FIG. 12 does not constitute a limitation on the apparatus 1200. In addition to the components shown in FIG. 12, the apparatus 1200 may include more or fewer components than those shown in the figure, or some components may be combined, or different component arrangements may be used.

The apparatuses such as the charging processing function entity, the charging enablement function entity, the management function entity, and the data repository service function entity in embodiments of this disclosure may all use the structure of the apparatus 1200 shown in FIG. 12.

For example, for the charging processing function entity, when the processor in the charging processing function entity executes executable code or an application stored in the memory, the charging processing function entity may perform the method steps corresponding to the charging processing function entity in the foregoing embodiments. For a specific execution process, refer to the foregoing embodiments. Details are not described herein again. Other apparatuses are similar thereto.

The terms "first" and "second" in embodiments of this disclosure are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this disclosure, unless otherwise stated, "a plurality of" means two or more.

In this disclosure, the term "at least one" means one or more, and the term "a plurality of" means two or more. For example, a plurality of first packets means two or more first packets.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects, and represents that three relationships may exist. For example, A and/or B may represent the following three cases: Only A exists, both A and B exist, and only B exists. In addition, the character "/" in this disclosure generally indicates an "or" relationship between associated objects. It should be further understood that the term "include" (or "includes", "including", "comprises", and/or "comprising"), when being used in this specification, specifies the presence of stated features, integers, steps, operations, elements, and/or components, but does not preclude the presence or addition of one or more other features, integers, steps, operations, elements, components, and/or groups thereof.

It should be further understood that sequence numbers of processes do not mean execution sequences in embodiments of this disclosure. The execution sequences of the processes should be determined based on functions and internal logic of the processes, and should not be construed as any limitation on the implementation processes of embodiments of this disclosure. A person of ordinary skill in the art may be aware that, in combination with the examples described in embodiments disclosed in this specification, modules and algorithm steps can be implemented by electronic hardware, computer software, or a combination thereof. To clearly describe the interchangeability between hardware and software, the foregoing has generally described compositions and steps of the examples based on functions. Whether the functions are executed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person of ordinary skill in the art that, for the purpose of convenient and brief description, for a detailed working process of the foregoing system, apparatus, and module, refer to a corresponding process in the foregoing method embodiments. Details are not described herein again.

In the several embodiments provided in this disclosure, it should be understood that the disclosed system, apparatus, and method may be implemented in other manners. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this disclosure.

In addition, functional modules in embodiments of this disclosure may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions in this disclosure essentially, or a part contributing to the conventional technology, or all or some of the technical solutions may be embodied in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or another programmable apparatus. The computer program product may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

The foregoing descriptions are merely specific embodiments of this disclosure, but are not intended to limit the protection scope of this disclosure. Any modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A charging method, comprising:
obtaining first group information of a local area network (LAN) group comprising a set of user equipments that perform private communication in a LAN service, wherein the first group information comprises: an external group identifier of the LAN group associated to an internal group identifier of the LAN group, the internal group identifier of the LAN group, and a member list of the LAN group; and
performing charging for using the LAN service by the LAN group based on the first group information of the LAN group, wherein the performing charging comprises generating a charging data record of the LAN group, wherein the charging data record comprises the first group information.

2. The charging method according to claim 1, wherein obtaining the first group information of the LAN group comprises: receiving the first group information of the LAN group from a charging enablement function entity or a network exposure function entity.

3. The charging method according to claim 1, wherein the internal group identifier of the LAN group is used to associate network-side charging information of the LAN group comprised in network-side charging information received from a core network element.

4. The charging method according to claim 3, wherein the core network element is a session management network element.

5. The charging method according to claim 3, wherein the performing charging comprises:
associating the network-side charging information of the LAN group comprised in the network-side charging information received from the core network element based on the internal group identifier, wherein the network-side charging information comprises: one or more of traffic usage, duration usage, or a quantity of connections.

6. The charging method according to claim 5, wherein the performing charging further comprises:
writing the associated network-side charging information of the LAN group into the charging data record or a processed charging data record of the LAN group.

7. The charging method according to claim 1, wherein the method is performed by a charging processing function entity.

8. An apparatus comprising:
at least one processor; and
one or more memories coupled to the at least one processor and storing programming instructions for execution by the at least one processor to perform operations comprising:

obtaining first group information of a local area network (LAN) group comprising a set of user equipments that perform private communication in a LAN service, wherein the first group information comprises: an external group identifier of the LAN group associated to an internal group identifier of the LAN group, the internal group identifier of the LAN group, and a member list of the LAN group; and
performing charging for using the LAN service by the LAN group based on the first group information of the LAN group, wherein the performing charging comprises generating a charging data record of the LAN group, wherein the charging data record comprises the first group information.

9. The apparatus according to claim 8, wherein obtaining the first group information of the LAN group comprises: receiving the first group information of the LAN group from a charging enablement function entity or a network exposure function entity.

10. The apparatus according to claim 8, wherein the internal group identifier of the LAN group is used to associate network-side charging information of the LAN group comprised in network-side charging information received from a core network element.

11. The apparatus according to claim 10, wherein the core network element is a session management network element.

12. The apparatus according to claim 10, wherein the performing charging comprises:
associating the network-side charging information of the LAN group comprised in the network-side charging information received from the core network element based on the internal group identifier, wherein the network-side charging information comprises: one or more of traffic usage, duration usage, or a quantity of connections.

13. The apparatus according to claim 12, wherein the performing charging further comprises:
writing the associated network-side charging information of the LAN group into the charging data record or a processed charging data record of the LAN group.

14. The apparatus according to claim 8, wherein the method is performed by a charging processing function entity.

15. A non-transitory, computer-readable medium storing one or more instructions executable by at least one processor to perform operations comprising:
obtaining first group information of a local area network (LAN) group comprising a set of user equipments that perform private communication in a LAN service, wherein the first group information comprises: an external group identifier of the LAN group associated to an internal group identifier of the LAN group, the internal group identifier of the LAN group, and a member list of the LAN group; and
performing charging for using the LAN service by the LAN group based on the first group information of the LAN group, wherein the performing charging comprises generating a charging data record of the LAN group, wherein the charging data record comprises the first group information.

16. The non-transitory, computer-readable medium according to claim 15, wherein obtaining the first group information of the LAN group comprises: receiving the first group information of the LAN group from a charging enablement function entity or a network exposure function entity.

17. The non-transitory, computer-readable medium according to claim 15, wherein the internal group identifier of the LAN group is used to associate network-side charging information of the LAN group comprised in network-side charging information received from a core network element.

18. The non-transitory, computer-readable medium according to claim 17, wherein the core network element is a session management network element.

19. The non-transitory, computer-readable medium according to claim 17, wherein the performing charging comprises:

associating the network-side charging information of the LAN group comprised in the network-side charging information received from the core network element based on the internal group identifier, wherein the network-side charging information comprises: one or more of traffic usage, duration usage, or a quantity of connections.

20. The non-transitory, computer-readable medium according to claim 19, wherein the performing charging further comprises:

writing the associated network-side charging information of the LAN group into the charging data record or a processed charging data record of the LAN group.

* * * * *